US012669760B2

(12) United States Patent
Mochida et al.

(10) Patent No.: US 12,669,760 B2
(45) Date of Patent: Jun. 30, 2026

(54) SILICA PARTICLE, TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Mai Mochida, Kanagawa (JP); Sakae Takeuchi, Kanagawa (JP); Yuka Zenitani, Kanagawa (JP); Hajime Sugahara, Kanagawa (JP); Mieko Seki, Kanagawa (JP); Kota Nohara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 485 days.

(21) Appl. No.: 18/469,027

(22) Filed: Sep. 18, 2023

(65) Prior Publication Data

US 2024/0118645 A1 Apr. 11, 2024

(30) Foreign Application Priority Data

Sep. 22, 2022 (JP) ................................. 2022-151977
Aug. 14, 2023 (JP) ................................. 2023-132177

(51) Int. Cl.
*G03G 9/097* (2006.01)

(52) U.S. Cl.
CPC ...... *G03G 9/09725* (2013.01); *C01P 2006/14* (2013.01); *C01P 2006/16* (2013.01)

(58) Field of Classification Search
CPC ............ G03G 9/09725; C01P 2006/14; C01P 2006/16
See application file for complete search history.

(56) References Cited

U.S. PATENT DOCUMENTS

| | | | |
|---|---|---|---|
| 2017/0227859 A1 | 8/2017 | Nakajima et al. | |
| 2021/0061667 A1 | 3/2021 | Omokawa et al. | |
| 2021/0300771 A1* | 9/2021 | Zenitani ................ | C09C 1/3081 |

FOREIGN PATENT DOCUMENTS

| | | |
|---|---|---|
| EP | 4 250 014 A1 | 9/2023 |
| JP | 2017-142400 A | 8/2017 |
| JP | 2021-151944 A | 9/2021 |
| JP | 6968632 B2 | 11/2021 |

OTHER PUBLICATIONS

Jun. 17, 2024 Extended Search Report issued in European Patent Application No. 23198500.3.

* cited by examiner

*Primary Examiner* — Peter L Vajda
*Assistant Examiner* — Jenna Kuipers
(74) *Attorney, Agent, or Firm* — Oliff PLC

(57) ABSTRACT

A silica particle is provided in which a pore size distribution curve obtained by nitrogen gas adsorption of the silica particle after baking at 350° C. has at least one peak at a pore diameter of 2 nm or less and at least one peak at a pore diameter of more than 2 nm and 50 nm or less, and D/B is 0.50 or greater and 2.50 or less, where D and B are the volumes of pores having a diameter of 2 nm or less and a diameter of 2 nm or more and 25 nm or less, respectively, determined from the pore size distribution curve obtained by nitrogen gas adsorption of the silica particle after baking at 350° C.

20 Claims, 2 Drawing Sheets

SILICA PARTICLE, TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-151977 filed Sep. 22, 2022, and Japanese Patent Application No. 2023-132177 filed Aug. 14, 2023.

BACKGROUND

(i) Technical Field

The present disclosure relates to a silica particle, toner for developing an electrostatic charge image, an electrostatic charge image developer, a toner cartridge, a process cartridge, an image forming apparatus, and an image forming method.

(ii) Related Art

Japanese Unexamined Patent Application Publication No. 2021-151944 discloses "silica particles containing a quaternary ammonium salt, wherein the ratio $F_{BEFORE}/F_{AFTER}$ is 0.90 or greater and 1.10 or less, where $F_{BEFORE}$ is the maximum frequency of pores having a diameter of 2 nm or less determined in a pore size distribution curve of unwashed silica particles obtained by nitrogen adsorption, and $F_{AFTER}$ is that determined in a pore size distribution curve of washed silica particles obtained by nitrogen adsorption, and the ratio $F_{SINTERING}/F_{BEFORE}$ is 5 or greater and 20 or less, where $F_{SINTERING}$ is the maximum frequency of pores having a diameter of 2 nm or less determined in a pore size distribution curve of unwashed silica particles baked at 600° C."

Japanese Patent No. 6968632 discloses "a hydrophobic silica powder that has a hydrophobicity of 50% or more, a saturated water content of 4% or less, and a nitrogen content of 0.05% or more, comprising an amine having a boiling point of 100° C. or more in an amount of 0.1% or more."

SUMMARY

Aspects of non-limiting embodiments of the present disclosure relate to a silica particle for which a pore size distribution curve obtained by nitrogen gas adsorption after baking at 350° C. has at least one peak at a pore diameter of 2 nm or less and at least one peak at a pore diameter of more than 2 nm and 50 nm or less and that may achieve improved charge build-up compared with silica particles having a D/B of less than 0.50, where D and B are the volumes of pores having a diameter of 2 nm or less and a diameter of 2 nm or more and 25 nm or less, respectively, determined from the pore size distribution curve obtained by nitrogen gas adsorption after baking at 350° C.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a silica particle, wherein a pore size distribution curve obtained by nitrogen gas adsorption of the silica particle after baking at 350° C. has at least one peak at a pore diameter of 2 nm or less and at least one peak at a pore diameter of more than 2 nm and 50 nm or less; and D/B is 0.50 or greater and 2.50 or less, where D and B are volumes of pores having a diameter of 2 nm or less and a diameter of 2 nm or more and 25 nm or less, respectively, determined from the pore size distribution curve obtained by nitrogen gas adsorption of the silica particle after baking at 350° C.

BRIEF DESCRIPTION OF THE DRAWINGS

Exemplary embodiments of the present disclosure will be described in detail based on the following figures, wherein.

DETAILED DESCRIPTION

Figure 1:
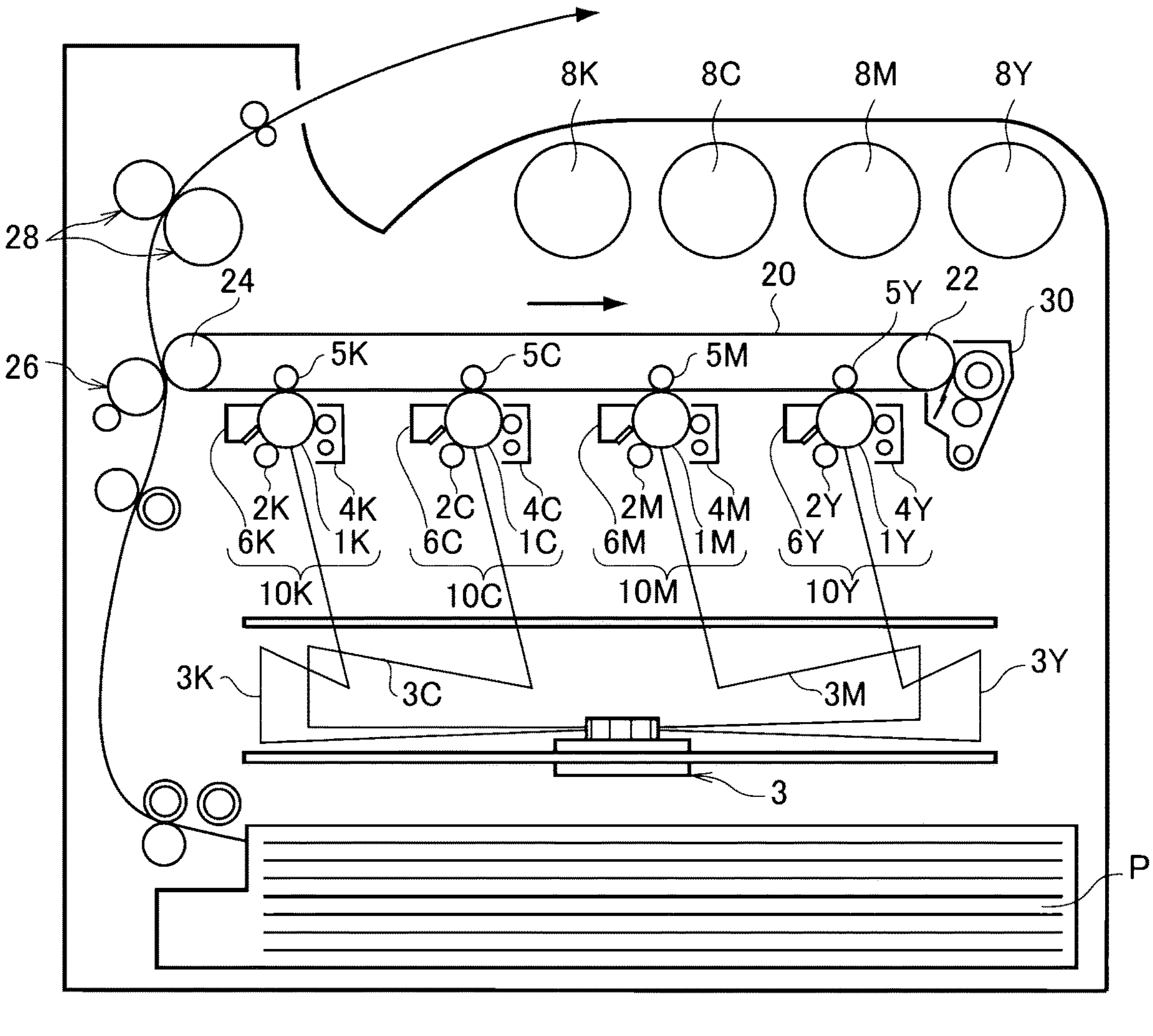
FIG. 1 is a schematic diagram illustrating the structure of an example of an image forming apparatus according to an exemplary embodiment.

Exemplary embodiments will now be described. The descriptions and the Examples section are for illustrative purposes and are not intended to limit the scope of embodiments.

Numerical ranges specified herein with "A-B," "between A and B," "(from) A to B," etc., represent inclusive ranges, which include the minimum A and the maximum B as well as all values in between.

In a series of numerical ranges presented herein, the upper or lower limit of a numerical range may be substituted with that of another in the same series. The upper or lower limit of a numerical range, furthermore, may be substituted with a value indicated in the Examples section.

As used herein, the word "step" does not always represent an independent step; as long as its purpose is fulfilled, a step may be continuous with or part of another.

Reference to a drawing in a description of an exemplary embodiment does not mean that the structure of the exemplary embodiment is limited to the structure illustrated in the drawing. The size of elements in each drawing is conceptual; the relative sizes of the elements do not need to be as illustrated.

A constituent herein may be a combination of multiple substances. If a composition mentioned herein contains a combination of multiple substances as one of its constituents, the amount of the constituent represents the total amount of the substances in the composition unless stated otherwise.

A constituent herein may be a combination of multiple kinds of particles. If a composition contains a combination of multiple kinds of particles as one of its constituents, the diameter of particles of the constituent is that of the mixture of the multiple kinds of particles present in the composition unless stated otherwise.

As used herein, the term "(meth)acrylic" includes both acrylic and methacrylic, and "(meth)acrylate" includes both an acrylate and a methacrylate.

"Toner for developing an electrostatic charge image" may be herein referred to as "toner," "an electrostatic charge image developer" may be herein referred to as "a developer," and "a carrier for developing an electrostatic charge image" may be referred to as "a carrier."

Silica Particles

Silica particles according to an exemplary embodiment contain a nitrogen-containing compound, a pore size distribution curve obtained by nitrogen gas adsorption of the silica particles after baking at 350° C. has at least one peak at a pore diameter of 2 nm or less and at least one peak at a pore diameter of more than 2 nm and 50 nm or less, and D/B is 0.50 or greater and 2.50 or less, where D and B are the volumes of pores having a diameter of 2 nm or less and a diameter of 2 nm or more and 25 nm or less, respectively, determined from the pore size distribution curve obtained by nitrogen gas adsorption of the silica particles after baking at 350° C.

In the following, pores having a diameter of 2 nm or less are also referred to as micropores, and pores having a diameter of more than 2 nm and 50 nm or less or 2 nm or more and 25 nm or less are also referred to as mesopores.

The silica particles according to this exemplary embodiment may achieve improved charge build-up. Possible reasons are as follows.

Silica particles are used as an additive or base ingredient in products such as powder paints, cosmetics, rubbers, and abrasives, for example for the purposes of improving the strength of a resin, improving the flowability of a powder, and reducing packing.

Because of their excessive negative chargeability, silica particles accumulate static electricity over time, losing characteristics such as flowability over time. A known technique to address this is to control the excessive negative charging by making a nitrogen-containing compound adsorbed onto or react with the surface of the silica particles.

Making a nitrogen-containing compound adsorbed onto or react with the surface of silica particles, however, reduces charge build-up because high positive chargeability of the nitrogen-containing compound broadens charge distribution.

To address this, the silica particles according to this exemplary embodiment are configured such that their pore size distribution curve obtained by nitrogen gas adsorption after baking at 350° C. has at least one peak at a pore diameter of 2 nm or less and at least one peak at a pore diameter of more than 2 nm and 50 nm or less. In other words, the silica particles are configured to have not only mesopores but also micropores.

In addition to this, the ratio D/B, where D is the volume of pores having a diameter of 2 nm or less, and B is that of pores having a diameter of 2 nm or more and 25 nm or less, both determined from the pore size distribution curve obtained by nitrogen gas adsorption after baking at 350° C., is in the range specified above; by virtue of the predominance of micropores over mesopores, the silica particles have an increased specific surface area.

The nitrogen-containing compound, therefore, may be present in not only mesopores but also micropores in the silica particles. A nitrogen-containing compound present in silica particles appears to reduce the dielectric constant of the particles with its charge different from that of the particles.

In addition, the possibility of the presence of a sufficient amount of nitrogen-containing compound in mesopores and micropores in the silica particles, rather than on the surface of the silica particle, means that excessive positive charging and the detachment of the nitrogen-containing compound may be limited. The broadening of charge distribution, therefore, may also be limited.

Presumably for these reasons, the silica particles according to this exemplary embodiment may achieve improved charge build-up.

The details of the silica particles according to this exemplary embodiment will now be described.

Pore Size Distribution

For the silica particles according to this exemplary embodiment, a pore size distribution curve obtained by nitrogen gas adsorption after baking at 350° C. has at least one peak at a pore diameter of 2 nm or less and at least one peak at a pore diameter of more than 2 nm and 50 nm or less. In other words, the pore size distribution curve has a first peak at a pore diameter of 2 nm or less and a second peak at a pore diameter of more than 2 nm and 50 nm or less.

The silica particles according to this exemplary embodiment, therefore, are silica particles having not only mesopores but also micropores.

In the foregoing, having at least one peak at a certain pore diameter means that the pore size distribution curve obtained by nitrogen gas adsorption, with frequency by volume on the vertical axis and pore diameter on the horizontal axis, has at least one peak with a maximum of 0.005 $cm^3/g\cdot nm$ or more in the specified range of pore diameters. At pore diameters of 2 nm or less, however, the frequency by volume can increase with decreasing pore size because the lower limit of measurement of nitrogen adsorption measurement is 1 nm; in that case, 1 nm is regarded as the diameter at which a peak has its maximum.

Pore Volumes

D/B, where D and B are the volumes of pores having a diameter of 2 nm or less and a diameter of 2 nm or more and 25 nm or less, respectively, determined from the pore size distribution curve obtained by nitrogen gas adsorption of the silica particles after baking at 350° C., is 0.50 or greater and 2.50 or less; D/B may be 0.55 or greater and 2.00 or less, preferably 0.60 or greater and 1.80 or less, for the improvement of charge build-up.

The volumes D and B of pores having a diameter of 2 nm or less and a diameter of 2 nm or more and 25 nm or less after baking at 350° C. are original volumes of pores in the silica particles, i.e., pore volumes after adsorbates adsorbed in pores in the silica particles are removed through the baking. For example, if a nitrogen-containing compound has been adsorbed in pores in the silica particles, D and B are pore volumes after the nitrogen-containing compound adsorbed in pores in the silica particles and plugging a subset of the pores evaporates away. The greater D/B is, the more predominant micropores are over mesopores. In other words, a greater D/B means that the nitrogen-containing compound can be adsorbed in not only at least a subset of mesopores but also at least a subset of micropores in the silica particles. A greater D/B, therefore, may help improve charge build-up.

Overall, silica particles having a D/B of 0.50 or greater and 2.50 or less, where D and B are the volumes of pores having a diameter of 2 nm or less and a diameter of 2 nm or more and 25 nm or less determined from a pore size distribution curve obtained by nitrogen gas adsorption of the silica particles after baking at 350° C., may be silica particles superior in charge build-up when a nitrogen-containing compound is present.

The amount of the nitrogen-containing compound may be 0.02% by mass or more and 1.45% by mass or less, preferably 0.1% by mass or more and 1.1% by mass or less, more preferably 0.2% by mass or more and 1.1% by mass or less, as a nitrogen content of the silica particles for the improvement of charge build-up.

The amount of the nitrogen-containing compound (i.e., the nitrogen content of the silica particles) is measured under the following conditions using an elemental analyzer (e.g., Sumika Chemical Analysis Service's NCH-22F).

Reaction temperature: 830° C.

Reduction temperature: 600° C.

Reference material: Acetanilide of a grade for use as a reference material in quantitative elemental analysis.

Prior to the measurement, the silica particles of interest are subjected to a treatment in which the silica particles are dried at 100° C. for 24 hours or longer in a vacuum dryer so that ammonia and other impurities will be removed from them.

D, which is the volume of pores having a diameter of 2 nm or less after baking at 350° C., may be 0.10 $cm^3/g$ or more and 1.10 $cm^3/g$ or less, preferably 0.16 $cm^3/g$ or more and 0.80 $cm^3/g$ or less, more preferably 0.18 $cm^3/g$ or more and 0.70 $cm^3/g$ or less.

The volume D of pores having a diameter of 2 nm or less after baking at 350° C. is the original volume of micropores in the silica particles, i.e., a pore volume after adsorbates adsorbed in micropores in the silica particles are removed through the baking. If a nitrogen-containing compound has been adsorbed in micropores in the silica particles, D is a pore volume after the nitrogen-containing compound plugging a subset of the micropores evaporates away. In other words, pore volume D means that the nitrogen-containing compound can be adsorbed in at least a subset of micropores in the silica particles. Charge build-up, therefore, may be improved.

The ratio C/D, where C is the volume of pores having a diameter of 2 nm or less determined from a pore size distribution curve obtained by nitrogen gas adsorption of the silica particles before baking at 350° C., may be 0.05 or greater and 0.82 or less, preferably 0.05 or greater and 0.70 or less, more preferably 0.05 or greater and 0.50 or less.

The pore volume C before baking at 350° C. is a pore volume with the nitrogen-containing compound adsorbed in micropores (with a subset of micropores plugged with the nitrogen compound).

A volume D of pores having a diameter of 2 nm or less after baking at 350° C. in the above ranges combined with a ratio C/D between the volume C of pores having a diameter of 2 nm or less before baking at 350° C. and the volume D of pores having a diameter of 2 nm or less after baking at 350° C. in the above ranges, in particular, means that a sufficient amount of nitrogen-containing compound has been adsorbed in at least a subset of micropores in the silica particles. A C/D in the above ranges, therefore, may further improve charge build-up.

The ratio A/B, where A is the volume of pores having a diameter of 2 nm or more and 25 nm or less determined from a pore size distribution curve obtained by nitrogen gas adsorption of the silica particles before baking at 350° C., may be 0 or greater and 0.92 or less, preferably 0 or greater and 0.75 or less, more preferably 0 or greater and 0.60 or less.

In this context, an A/B of 0 means when A is 0.

The pore volume B after baking at 350° C. is the original volume of mesopores in the silica particles, i.e., a pore volume after adsorbates adsorbed in mesopores in the silica particles are removed through the baking. If a nitrogen-containing compound has been adsorbed in mesopores in the silica particles, B is the volume of mesopores after the nitrogen-containing compound plugging a subset of the mesopores evaporates away.

The pore volume A before baking at 350° C., on the other hand, is a pore volume with the nitrogen-containing compound adsorbed in mesopores (with a subset of mesopores plugged with the nitrogen compound).

An A/B in the above ranges means that a sufficient amount of nitrogen-containing compound has been adsorbed in at least a subset of mesopores in the silica particles. An A/B in the above ranges, therefore, may further improve charge build-up.

In the foregoing, the baking at 350° C. is to heat the particles to 350° C. at a rate of 10° C./min, hold at 350° C. for 3 hours, and cool to room temperature (25° C.) at a rate of 10° C./min, all in a nitrogen environment.

Measurement of the Pore Size Distribution Curves Obtained by Nitrogen Gas Adsorption and the Pore Volumes The method for measuring the pore size distribution curves obtained by nitrogen gas adsorption is as follows.

The silica particles are cooled to the temperature of liquid nitrogen (−196° C.), nitrogen gas is introduced, and the amount of adsorbed nitrogen gas is determined by the volumetric or gravimetric method. An adsorption isotherm is created by gradually increasing the pressure of the introduced nitrogen gas and plotting the amount of adsorbed nitrogen gas at different equilibrium pressures. The measurement of the amount of nitrogen gas adsorbed on the silica particles is carried out using BEL JAPAN's BELSORP. The adsorption isotherm is transformed into a pore size distribution curve according to the formula in, for example, the BJH method, the SF method, or the DA method with frequency on the vertical axis and pore diameter on the horizontal axis. The resulting pore size distribution curve is transformed into a cumulative distribution of pore volume, with volume on the vertical axis and pore diameter on the horizontal axis.

In the resulting cumulative distribution of pore volume, the peaks in the specific pore diameter ranges are located.

The volumes of pores in the specific pore diameter ranges are calculated from the resulting cumulative distribution of pore volume; the calculated volumes are "the volumes of pores having the specified pore diameters."

Structure of the Silica Particles

A possible structure of the silica particles will now be described, together with the nitrogen-containing compound.

The silica particles may be silica particles including base silica particles and a coating structure covering at least part of the surface of the base silica particles and formed by a product of reaction of a silane coupling agent. The silica particles may have micropores in the surface of the base silica particles and mesopores in the coating structure.

The nitrogen-containing compound may be adhering to both the micropores and the mesopores.

The silane coupling agent may be at least one selected from the group consisting of monofunctional silane coupling agents, bifunctional silane coupling agents, and trifunctional silane coupling agents, preferably a trifunctional silane coupling agent.

The coating structure formed by a product of reaction of a silane coupling agent is less dense than the base silica particles and has a porous structure including micropores. A coating structure formed by a product of reaction of a silane coupling agent (trifunctional silane coupling agent in particular), furthermore, is compatible with nitrogen-containing compounds. The nitrogen-containing compound, therefore, penetrates to the inside of the coating structure (i.e., into pores in a porous structure).

In addition, the nitrogen-containing compound also penetrates to the inside of micropores in the base silica particles (i.e., into pores in a porous structure).

Presumably because of this, the amount of the nitrogen-containing compound in the silica particles may be relatively large. In addition, the nitrogen-containing compound may be unlikely to detach.

The surface of the base silica particles is negatively chargeable, and the adhesion of the positively chargeable nitrogen-containing compound may work to cancel out excessive negative charge on the base silica particles. Since the nitrogen-containing compound is adhering to the inside of a coating structure (e.g., the inside of pores in a porous structure) on the surface of the silica particles, it may be unlikely that the charge distribution of the silica particles broadens toward positive charge; rather, the compound may allow a narrower charge distribution in the silica particles to be achieved by cancelling out excessive negative charge on the base silica particles.

As a result, charge build-up may be further improved.

Base Silica Particles

The base silica particles may be dry silica or may be wet silica.

Examples of variations of dry silica include pyrogenic silica (fumed silica), produced by burning a silane compound; and VMC (vaporized metal combustion) silica, produced by burning a metal silicon powder explosively.

Examples of variations of wet silica include kinds of wet silica produced through neutralization between sodium silicate and a mineral acid (precipitated silica, synthesized and caused to aggregate under alkaline conditions, and silica gel, synthesized and caused to aggregate under acidic conditions); colloidal silica, produced by making an acidic silicic acid alkaline and polymerizing it; and sol-gel silica, produced through the hydrolysis of an organic silane compound (e.g., an alkoxysilane). The base silica particles may be sol-gel silica for the improvement of charge build-up.

Product of Reaction of a Silane Coupling Agent

The silane coupling agent may be a compound containing no N (element nitrogen). An example of a silane coupling agent is a silane coupling agent represented by formula (TA) below.

$$R^1_n\text{—}Si(OR^2)_{4-n} \quad \text{(TA)}$$

In formula (TA), $R^1$ is a C1 to C20 saturated or unsaturated aliphatic hydrocarbon or C6 to C20 aromatic hydrocarbon group, $R^2$ is a halogen atom or alkyl group, and n is 1, 2, or 3. If n is 2 or 3, the multiple $R^1$s may be groups of the same kind or may be different groups. If n is 1 or 2, the multiple $R^2$s may be groups of the same kind or may be different groups.

Examples of products of reaction of a silane coupling agent include reaction products having, in formula (TA) for example, a OH substituent in place of all or a subset of the $OR^2$s; reaction products having OH substituents in place of $OR^2$s and in which all or a subset of the OH groups have been polycondensed together; and reaction products having OH substituents in place of $OR^2$s and in which all or a subset of the OH substituents have been polycondensed with SiOH groups of the base silica particles.

An aliphatic hydrocarbon group represented by $R^1$ in formula (TA) may be linear, branched, or cyclic, preferably linear or branched. The aliphatic hydrocarbon group may be C1 to C20, preferably 11 to C18, more preferably C1 to C12, even more preferably C1 to C10. The aliphatic hydrocarbon group may be saturated or unsaturated, but preferably is a saturated aliphatic hydrocarbon group, more preferably an alkyl group. The hydrogen atoms in the aliphatic hydrocarbon group may have been replaced with a halogen atom.

Examples of saturated aliphatic hydrocarbon groups include linear alkyl groups (e.g., the methyl, ethyl, propyl, butyl, pentyl, hexyl, heptyl, octyl, nonyl, decyl, dodecyl, hexadecyl, and icosyl groups), branched alkyl groups (e.g., the isopropyl, isobutyl, isopentyl, neopentyl, 2-ethylhexyl, tertiary butyl, tertiary pentyl, and isopentadecyl groups), and cyclic alkyl groups (e.g., the cyclopropyl, cyclopentyl, cyclohexyl, cycloheptyl, cyclooctyl, tricyclodecyl, norbornyl, and adamantyl groups).

Examples of unsaturated aliphatic hydrocarbon groups include alkenyl groups (e.g., the vinyl (ethenyl), 1-propenyl, 2-propenyl, 2-butenyl, 1-butenyl, 1-hexenyl, 2-dodecenyl, and pentenyl groups) and alkynyl groups (e.g., the ethynyl, 1-propynyl, 2-propynyl, 1-butynyl, 3-hexynyl, and 2-dodecynyl groups).

An aromatic hydrocarbon group represented by $R^1$ in formula (TA) may be C6 to C20, preferably C6 to C18, more preferably C6 to C12, even more preferably C6 to C10. Examples of aromatic hydrocarbon groups include the phenylene, biphenylene, terphenylene, naphthalene, and anthracene groups. The hydrogen atoms in the aromatic hydrocarbon group may have been replaced with a halogen atom.

A halogen atom represented by $R^2$ in formula (TA) can be, for example, a fluorine, chlorine, bromine, or iodine atom, preferably is a chlorine, bromine, or iodine atom.

An alkyl group represented by $R^2$ in formula (TA) may be a C1 to C10 alkyl group, preferably a C1 to C8 alkyl group, more preferably a C1 to C4 alkyl group. Examples of C1 to C10 linear alkyl groups include the methyl, ethyl, n-propyl, n-butyl, n-pentyl, n-hexyl, n-heptyl, n-octyl, n-nonyl, and n-decyl groups. Examples of C3 to C10 branched alkyl groups include the isopropyl, isobutyl, sec-butyl, tert-butyl, isopentyl, neopentyl, tert-pentyl, isohexyl, sec-hexyl, tert-hexyl, isoheptyl, sec-heptyl, tert-heptyl, isooctyl, sec-octyl, tert-octyl, isononyl, sec-nonyl, tert-nonyl, isodecyl, sec-decyl, and tert-decyl groups. Examples of C3 to C10 cyclic alkyl groups include the cyclopropyl, cyclobutyl, cyclopentyl, cyclohexyl, cycloheptyl, cyclooctyl, cyclononyl, and cyclodecyl groups and polycyclic (e.g., bicyclic, tricyclic, and spirocyclic) alkyl groups formed by such monocyclic alkyl groups linked together. The hydrogen atoms in the alkyl group may have been replaced with a halogen atom.

n in formula (TA) is 1, 2, or 3, preferably 1 or 2, more preferably 1.

The silane coupling agent represented by formula (TA) may be a trifunctional silane coupling agent in which $R^1$ is a C1 to C20 saturated aliphatic hydrocarbon group, $R^2$ is a halogen atom or C1 to C10 alkyl group, and n is 1.

Examples of trifunctional silane coupling agents include vinyltrimethoxysilane, vinyltriethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (compounds of formula (TA) in which $R^1$ is an unsubstituted aliphatic or unsubstituted aromatic hydrocarbon group); and 3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane (compounds of formula (TA) in which $R^1$ is a substituted aliphatic or substituted aromatic hydrocarbon group). One trifunctional silane coupling agent may be used alone, or two or more may be used in combination.

The trifunctional silane coupling agent may be an alkyltrialkoxysilane, preferably an alkyltrialkoxysilane of formula (TA) in which $R^1$ is a C1 to C20 (preferably C1 to C15, more preferably C1 to C8, even more preferably C1 to C4, in particular C1 or C2) alkyl group, and $R^2$ is a C1 or C2 alkyl group.

More specifically, the silane coupling agent forming the coating structure on the surface of the base silica particles may be at least one trifunctional silane coupling agent selected from the group consisting of alkyltrimethoxysilanes and alkyltriethoxysilanes having a C1 to C20 alkyl group;

preferably at least one trifunctional silane coupling agent selected from the group consisting of alkyltrimethoxysilanes and alkyltriethoxysilanes having a C1 to C15 alkyl group;

more preferably at least one trifunctional silane coupling agent selected from the group consisting of alkyltrimethoxysilanes and alkyltriethoxysilanes having a C1 to C8 alkyl group;

even more preferably at least one trifunctional silane coupling agent selected from the group consisting of alkyltrimethoxysilanes and alkyltriethoxysilanes having a C1 to C4 alkyl group;

in particular at least one trifunctional silane coupling agent selected from the group consisting of methyltrimethoxysilane, ethyltrimethoxysilane, methyltriethoxysilane, and ethyltriethoxysilane.

The amount of the coating structure formed by a product of reaction of a silane coupling agent may be 5% by mass or more and 100% by mass or less, preferably 7% by mass or more and 25% by mass or less, of the silica particles as a whole.

Nitrogen-Containing Compound

The nitrogen-containing compound is a nitrogen-containing compound that is neither ammonia nor a compound that is gas at temperatures of 25° C. or below.

The nitrogen-containing compound may be adhering to the inside of micropores in the surface of the base silica particles and also to the inside of mesopores in the coating structure formed by a product of reaction of a silane coupling agent (i.e., the inside of mesopores in a porous structure). One nitrogen-containing compound or two or more may be used.

The nitrogen-containing compound can be, for example, at least one selected from the group consisting of quaternary ammonium salts, primary amine compounds, secondary amine compounds, tertiary amine compounds, amide compounds, imine compounds, and nitrile compounds. Preferably, the nitrogen-containing compound is a quaternary ammonium salt.

Specific examples of primary amine compounds include phenethylamine, toluidine, catecholamine, and 2,4,6-trimethylaniline.

Specific examples of secondary amine compounds include dibenzylamine, 2-nitrodiphenylamine, and 4-(2-octylamino)diphenylamine.

Specific examples of tertiary amine compounds include 1,8-bis(dimethylamino)naphthalene, N,N-dibenzyl-2-aminoethanol, and N-benzyl-N-methylethanolamine.

Specific examples of amide compounds include N-cyclohexyl-p-toluenesulfonamide, 4-acetamido-1-benzylpiperidine, and N-hydroxy-3-[1-(phenylthio)methyl-1H-1,2,3-triazol-4-yl]benzamide.

Specific examples of imine compounds include diphenylmethaneimine, 2,3-bis(2,6-diisopropylphenylimino)butane, and N,N'-(ethane-1,2-diylidene)bis(2,4,6-trimethylaniline).

Specific examples of nitrile compounds include 3-indoleacetonitrile, 4-[(4-chloro-2-pyrimidinyl)amino]benzonitrile, and 4-bromo-2,2-diphenylbutyronitrile.

An example of a quaternary ammonium salt is a compound represented by formula (1) below.

Formula (1)

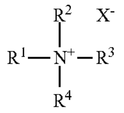

In formula (1), $R^1$, $R^2$, $R^3$, and $R^4$ each independently represent a hydrogen atom, alkyl group, aralkyl group, or aryl group, and $X^-$ represents a negative ion. At least one of $R^1$, $R^2$, $R^3$, or $R^4$, however, represents an alkyl, aralkyl, or aryl group. Two or more of $R^1$, $R^2$, $R^3$, and $R^4$ may be linked together to form an aliphatic ring, aromatic ring, or heterocycle. Alkyl, aralkyl, and aryl groups may have a substituent.

An alkyl group represented by $R^1$ to $R^4$ can be, for example, a C1 to C20 linear or C3 to C20 branched alkyl group. Examples of C1 to C20 linear alkyl groups include the methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, and n-hexadecyl groups. Examples of C3 to C20 branched alkyl groups include the isopropyl, isobutyl, sec-butyl, tert-butyl, isopentyl, neopentyl, tert-pentyl, isohexyl, sec-hexyl, tert-hexyl, isoheptyl, sec-heptyl, tert-heptyl, isooctyl, sec-octyl, tert-octyl, isononyl, sec-nonyl, tert-nonyl, isodecyl, sec-decyl, and tert-decyl groups.

An alkyl group represented by $R^1$ to $R^4$ may be a C1 to C15 alkyl group, such as a methyl, ethyl, butyl, or tetradecyl group.

An aralkyl group represented by $R^1$ to $R^4$ can be, for example, a C7 to C30 aralkyl group. Examples of C7 to C30 aralkyl groups include the benzyl, phenylethyl, phenylpropyl, 4-phenylbutyl, phenylpentyl, phenylhexyl, phenylheptyl, phenyloctyl, phenylnonyl, naphthylmethyl, naphthylethyl, anthrylmethyl, and phenyl-cyclopentylmethyl groups.

An aralkyl group represented by $R^1$ to $R^4$ may be a C7 to C15 aralkyl group, such as a benzyl, phenylethyl, phenylpropyl, or 4-phenylbutyl group.

An aryl group represented by $R^1$ to $R^4$ can be, for example, a C6 to C20 aryl group. Examples of C6 to C20 aryl groups include the phenyl, pyridyl, and naphthyl groups.

An aryl group represented by $R^1$ to $R^4$ may be a C6 to C10 aryl group, such as a phenyl group.

A ring formed by two or more of $R^1$, $R^2$, $R^3$, and $R^4$ linked together can be, for example, a C2 to C20 alicyclic ring or C2 to C20 heterocyclic amine.

$R^1$, $R^2$, $R^3$, and $R^4$ may each independently have a substituent. Examples of substituents include a nitrile group, a carbonyl group, an ether group, an amide group, a siloxane group, a silyl group, and an alkoxysilane group.

$R^1$, $R^2$, $R^3$, and $R^4$ may each independently represent a C1 to C16 alkyl group, C7 to C10 aralkyl group, or C6 to C20 aryl group.

The negative ion, represented by $X^-$, may be an organic or inorganic negative ion.

Examples of organic negative ions include polyfluoroalkylsulfonate ions, polyfluoroalkylcarboxylate ions, the tetraphenylborate ion, aromatic carboxylate ions, and aromatic sulfonate ions (e.g., the 1-naphthol-4-sulfonate ion).

Examples of inorganic negative ions include $OH^-$, $F^-$, $Fe(CN)_6^{3-}$, $Cl^-$, $Br^-$, $NO_2^-$, $NO_3^-$, $CO_3^-$, $PO_4^-$, and $SO_4^-$.

Alternatively, the negative ion may be a negative ion containing the element molybdenum, such as a molybdate ion. Molybdate ions The negative ion containing the element molybdenum may be a molybdate ion, preferably a molybdate ion with tetravalent or hexavalent molybdenum, more preferably a molybdate ion with hexavalent molybdenum. Specific examples of molybdate ions include $MoO_4^{2-}$, $Mo_2O_7^{2-}$, $Mo_3O_{10}^{2-}$, $Mo_4O_{13}^{2-}$, $Mo_7O_{24}^{2-}$, and $Mo_8O_{26}^{4-}$.

The compound represented by formula (1) may have a total of 18 to 35 carbon atoms, preferably 20 to 32, for the improvement of charge build-up.

Examples of compounds represented by formula (1) are presented below. This exemplary embodiment is not limited to these.

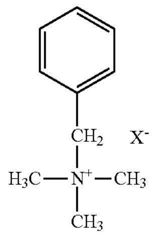

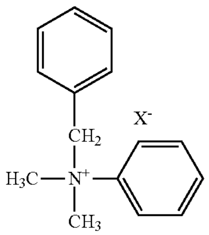

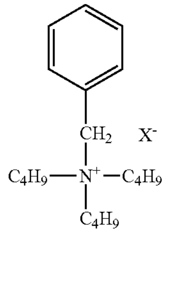

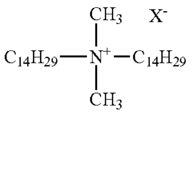

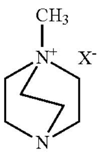

-continued

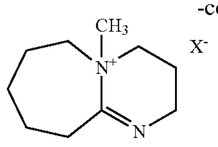

For the improvement of charge build-up, the nitrogen-containing compound may be a nitrogen-containing compound that also contains the element molybdenum (hereinafter also referred to as a molybdenum- and nitrogen-containing compound) in particular. Specifically, the molybdenum- and nitrogen-containing compound may be, for example, at least one selected from the group consisting of quaternary ammonium salts containing the element molybdenum and mixtures of a quaternary ammonium salt and a metal oxide containing the element molybdenum, preferably a quaternary ammonium salt containing the element molybdenum.

Quaternary ammonium salts containing the element molybdenum may be highly effective in maintaining charge distribution by virtue of the strong bond between the molybdenum-containing anion and the quaternary ammonium cation; with such a salt, therefore, charge build-up may be further improved.

Examples of quaternary ammonium salts containing the element molybdenum include quaternary ammonium molybdates, such as $[N^+(CH)_3(C_{14}C_{29})_2]_4Mo_8O_{28}^{4-}$, $[N^+(C_4H_9)_2(C_6H_6)_2]_2Mo_2O_7^{2-}$, $[N^+(CH_3)_2(CH_2C_6H_6)(CH_2)_{17}CH_3]_2MoO_4^{2-}$, and $[N^+(CH_3)_2(CH_2C_6H_6)(CH_2)_{15}CH_3]_2MoO_4^{2-}$.

The quaternary ammonium salt containing the element molybdenum may be the compound identified by CAS Registry No. 117342-25-3 in particular. The compound identified by CAS Registry No. 117342-25-3 also has the names of TP-415 and 1-tetradecanaminium, N,N-dimethyl-N-tetradecyl-, hexa-μ-oxotetra-μ3-oxodi-μ5-oxotetradecaoxooctamolybdate(4-) (4:1).

Examples of metal oxides containing the element molybdenum include molybdenum oxides (molybdenum trioxide, molybdenum dioxide, and $Mo_9O_{26}$), alkali metal molybdates (e.g., lithium molybdate, sodium molybdate, and potassium molybdate), alkaline earth metal molybdates (e.g., magnesium molybdate and calcium molybdate), and complex oxides (e.g., $Bi_2O_3 \cdot 2MoO_3$ and $\gamma$-$Ce_2Mo_3O_{13}$).

The silica particles are found to contain a nitrogen-containing compound when heated in a temperature zone within the range of 300° C. to 600° C. The nitrogen-containing compound can be detected by heating at 300° C. or above and 600° C. or below in an inert gas; for example, it is detected using a heating-furnace free-fall pyrolysis gas chromatograph-mass spectrometer with He as a carrier gas. Specifically, 0.1 mg or more and 10 mg or less of the silica particles are introduced into the pyrolysis gas chromatograph-mass spectrometer, and the mass spectra for the detected peaks are examined to verify whether a nitrogen-containing compound is contained. Examples of products of pyrolysis of silica particles containing a nitrogen-containing compound include primary, secondary, and tertiary amines represented by formula (2) below and aromatic nitrogen compounds. $R^1$, $R^2$, and $R^3$ in formula (2) are synonymous with $R^1$, $R^2$, and $R^3$, respectively, in formula (1). If the nitrogen-containing compound is a quaternary ammonium salt, pyrolysis at 600° C. eliminates part of its chains, and a tertiary amine is detected.

Formula (2)

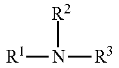

If the nitrogen-containing compound is a molybdenum-containing compound, the ratio between the net intensities for the element molybdenum and the element silicon in x-ray fluorescence analysis (Mo/Si) may be 0.014 or greater and 1.20 or less, preferably 0.10 or greater and 1.10 or less, more preferably 0.20 or greater and 1.10 or less for the improvement of charge build-up.

The net intensity for the element molybdenum may be 5 kcps or more and 150 kcps or less, preferably 10 kcps or more and 135 kcps or less, more preferably 25 kcps or more and 135 kcps or less for the improvement of charge build-up.

The net intensities for the element molybdenum and the element silicon are measured as follows.

Approximately 0.5 g of the silica particles is compressed into a 50-mm diameter and 2-mm thick disk by pressing it with a load of 6 t for 60 seconds using a compression molding machine. This disk as a test specimen is analyzed using a scanning x-ray fluorescence spectrometer (XRF-1500, Shimadzu Corporation) under the conditions below to determine the chemical elements therein qualitatively and quantitatively, and the net intensities for the element molybdenum and the element silicon (in kcps, kilo-counts per second) are determined.

Tube voltage: 40 kV
Tube current: 90 mA
Measurement area (spot size): 10 mm diameter
Measurement time: 30 minutes
Anticathode material: Rhodium The amount X of the nitrogen-containing compound extracted from the silica particles into an ammonia/methanol mixture may be 0.1% by mass or more of the silica particles. It is possible that Y/X<0.3 at the same time, where X is the amount of the nitrogen-containing compound extracted from the silica particles into an ammonia/methanol mixture, and Y is the amount of the nitrogen-containing compound extracted from the silica particles into water.

This relation indicates that the nitrogen-containing compound in the silica particles is sparingly soluble in water, or does not adsorb much water in the air. If this relation holds, therefore, the silica particles may be superior in the narrowness and maintenance of charge distribution.

Amount X may be 0.25% by mass or more of the silica particles. As for the upper limit, amount X is 6.5% by mass or less for example. The ratio Y/X between amounts X and Y may be 0.

Amounts X and Y are measured by the following method.

The silica particles are analyzed on a thermogravimetric analyzer-mass spectrometer (e.g., NETZSCH Japan K.K.'s gas chromatograph-mass spectrometer) at 400° C., and the percentage by mass of compounds containing a C1 or longer hydrocarbon and a nitrogen atom covalently bound thereto is measured and integrated (W1).

One part by mass of the silica particles is added to 30 parts by mass of an ammonia/methanol solution (Sigma-Aldrich; ammonia/methanol ratio by mass=1/5.2) having a temperature of 25° C., the resulting mixture is sonicated for 30 minutes, and then the silica powder is isolated from the extractant. The isolated silica particles are dried in a vacuum dryer at 100° C. for 24 hours, and the percentage by mass of compounds containing a C1 or longer hydrocarbon and a nitrogen atom covalently bound thereto is measured on the thermogravimetric analyzer-mass spectrometer at 400° C. and integrated (W2).

One part by mass of the silica particles is added to 30 parts by mass of water having a temperature of 25° C., the resulting mixture is sonicated for 30 minutes, and then the silica particles are isolated from the extractant. The isolated silica particles are dried in a vacuum dryer at 100° C. for 24 hours, and the percentage by mass of compounds containing a C1 or longer hydrocarbon and a nitrogen atom covalently bound thereto is measured on the thermogravimetric analyzer-mass spectrometer at 400° C. and integrated (W3).

From W1 and W2, amount X, =W1−W2, is calculated.

From W1 and W3, amount Y, =W1−W3, is calculated.

Hydrophobized Structure

The silica particles according to this exemplary embodiment may have a hydrophobized structure (structure produced by treating the silica particles with a hydrophobizing agent) adhering to the coating structure formed by a product of reaction of a silane coupling agent.

The hydrophobizing agent is, for example, an organosilicon compound. Examples of organosilicon compounds include the following.

Alkoxysilane or halosilane compounds having a lower alkyl group, such as methyltrimethoxysilane, dimethyldimethoxysilane, trimethylchlorosilane, and trimethylmethoxysilane.

Alkoxysilane compounds having a vinyl group, such as vinyltrimethoxysilane and vinyltriethoxysilane.

Alkoxysilane compounds having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane.

Alkoxysilane compounds having a styryl group, such as p-styryltrimethoxysilane and p-styryltriethoxysilane.

Alkoxysilane compounds having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane.

Alkoxysilane compounds having an isocyanatoalkyl group, such as 3-isocyanatopropyltrimethoxysilane and 3-isocyanatopropyltriethoxysilane.

Silazane compounds, such as hexamethyldisilazane and tetramethyldisilazane.

The silica particles may have characteristics as described below for charge distribution narrowing and charge distribution maintenance reasons.

Average Circularity, Average Diameter of Primary Particles, and Geometric Standard Deviation by Number The average circularity of the silica particles according to this exemplary embodiment may be 0.80 or greater and 1.00 or less, preferably 0.85 or greater and 1.00 or less, more preferably 0.88 or greater and 1.00 or less.

The number-average diameter of the silica particles according to this exemplary embodiment may be 20 nm or more and 200 nm or less, preferably 20 nm or more and 80 nm or less, more preferably 20 nm or more and 60 nm or less.

The geometric standard deviation by number of the silica particles according to this exemplary embodiment may be 1.1 or greater and 2.0 or less, preferably 1.15 or greater and 1.6 or less.

Silica particles having a number-average diameter and a geometric standard deviation by number in the above ranges tend to be excessively charged because of their large specific surface area, but the silica particles according to this exemplary embodiment may achieve a narrower charge distribution and improved charge build-up even when their number-average diameter and geometric standard deviation by number are in the above ranges.

The method for measuring the average circularity, number-average diameter, and geometric standard deviation by number of the silica particles is as follows.

The toner is imaged at a magnification of 40,000 using a scanning electron microscope (SEM) (Hitachi High-Technologies, S-4800) coupled with an energy-dispersive x-ray spectrometer (EDX spectrometer) (HORIBA, EMAX Evolution X-Max 80 $mm^2$). A field of view in the image is analyzed by EDX to find 200 silica particles based on the presence of the elements N and Si. The figures of the 200 silica particles are analyzed using WinROOF image processing and analysis software (Mitani Corporation).

The equivalent circular diameter, area, and circumference of each figure of a primary particle are determined, and the circularity is calculated as 4π×(area of the particle figure)/(circumference of the particle figure)$^2$.

In the circularity distribution, the circularity at which the cumulative percentage from the smallest circularity is 50% is reported as the average circularity.

In the equivalent circular diameter distribution, the equivalent circular diameter at which the cumulative percentage by number of particles from the smallest diameter is 50% is reported as the number-average diameter of the particles.

The geometric standard deviation by number is determined as $(D84/D16)^{0.5}$, where D16 and D84 are the equivalent circular diameters in the equivalent circular diameter distribution at which the cumulative percentage by number of particles from the smallest diameter is 16% and 84%, respectively.

Degree of Hydrophobization

The degree of hydrophobization of the silica particles according to this exemplary embodiment may be 10% or more and 60% or less, preferably 20% or more and 55% or less, more preferably 28% or more and 53% or less.

The method for measuring the degree of hydrophobization of the silica particles is as follows.

A 0.2% by mass sample of the silica particles is put into 50 ml of deionized water, methanol is added dropwise from a burette with stirring on a magnetic stirrer, and the percentage by mass of methanol in the methanol-water mixture at the endpoint, i.e., at complete precipitation of the sample, is determined as the degree of hydrophobization.

Volume Resistivity

The volume resistivity R of the silica particles according to this exemplary embodiment may be $1.0\times10^{7}$ Ω·cm or more and $1.0\times10^{12.5}$ Ω·cm or less, preferably $1.0\times10^{7.5}$ Ω·cm or more and $1.0\times10^{12}$ Ω·cm or less, more preferably $1.0\times10^{8}$ Ω·cm or more and $1.0\times10^{11.5}$ Ω·cm or less, even more preferably $1.0\times10^{9}$ Ω·cm or more and $1.0\times10^{11}$ Ω·cm or less. The volume resistivity R of the silica particles can be adjusted by changing the amount of the nitrogen-containing compound.

The ratio Ra/Rb, where Ra and Rb are the volume resistivity of the silica particles according to this exemplary embodiment before and after baking at 350° C., respectively, may be 0.01 or greater and 0.8 or less, preferably 0.015 or greater and 0.6 or less.

The volume resistivity Ra of the silica particles according to this exemplary embodiment before baking at 350° C. (synonymous with the above volume resistivity R) may be $1.0\times10^{7}$ Ω·cm or more and $1.0\times10^{12.5}$ Ω·cm or less, preferably $1.0\times10^{7.5}$ Ω·cm or more and $1.0\times10^{12}$ Ω·cm or less, more preferably $1.0\times10^{8}$ Ω·cm or more and $1.0\times10^{11.5}$ Ω·cm or less, even more preferably $1.0\times10^{9}$ Ω·cm or more and $1.0\times10^{11}$ Ω·cm or less.

The baking at 350° C. is to heat the particles to 350° C. at a rate of 10° C./min, hold at 350° C. for 3 hours, and cool to room temperature (25° C.) at a rate of 10° C./min, all in a nitrogen environment.

The volume resistivity of the silica particles is measured in an environment at a temperature of 20° C. and a relative humidity of 50% as follows.

The silica particles are placed on the surface of a round test piece fitted with a 20-$cm^2$ plate electrode, approximately to a thickness of 1 mm or more and 3 mm or less, to form a layer of silica particles. A 20-$cm^2$ plate electrode is placed on the layer of silica particles to sandwich the layer with the other electrode, and the upper electrode is pressed down with a pressure of 0.4 MPa to eliminate spaces between silica particles. The thickness L (cm) of the layer of silica particles is measured. A Nyquist plot in the frequency range from $10^{-3}$ Hz to $10^{6}$ Hz is obtained using an impedance analyzer (Solartron Analytical) connected to the two electrodes above and below the layer of silica particles. The bulk resistance R (Ω) is determined by fitting the data to an equivalent circuit assuming the presence of the three components of resistance: bulk resistance, particle-to-particle interfacial resistance, and electrode contact resistance. From the bulk resistance R (Ω) and the thickness L (cm) of the layer of silica particles, the volume resistivity ρ (Ω·cm) of the silica particles is determined according to the equation $\rho=R/L$.

Solid-State Nuclear Magnetic Resonance (NMR) Spectrum

The silica particles according to this exemplary embodiment may be in form (A) below for the improvement of charge build-up.

Form (A): In a $^{29}$Si solid-state nuclear magnetic resonance (NMR) spectrum obtained by cross polarization/magic-angle spinning (CP/MAS) (hereinafter referred to as "the Si-CP/MAS NMR spectrum"), the ratio Cc/Dd is 0.10 or greater and 0.75 or less, where Cc is the integral of signals observed in the chemical shift range of −50 ppm to −75 ppm, and Dd is that of signals observed in the chemical shift range of −90 ppm to −120 ppm.

The Si-CP/MAS NMR spectrum is obtained by performing nuclear magnetic resonance spectroscopy under the following conditions.

Spectrometer: AVANCE 300 (Bruker)
Resonance frequency: 59.6 MHz
Nucleus measured: $^{29}$Si
Measurement method: CP MAS (with Bruker's default pulse sequence cp.av)

Delay time: 4 seconds
Contact time: 8 milliseconds
Number of scans: 2048
Measurement temperature: Room temperature (25° C. as measured)
Observed center frequency: −3975.72 Hz
MAS rotation: 7.0 mm-6 kHz
Reference material: Hexamethylcyclotrisiloxane The ratio Cc/Dd may be 0.10 or greater and 0.75 or less, preferably 0.12 or greater and 0.45 or less, more preferably 0.15 or more and 0.40 or less.

When the integral of all signals in the Si-CP/MAS NMR spectrum is defined as 100%, the percentage of the integral Cc of signals observed in the chemical shift range from −50 ppm to −75 ppm (signal ratio) may be 5% or more, preferably 7% or more. As for the upper limit, the percentage of signal integral Cc is, for example, 60% or less.

Form (A) is a form in which the silica particles have, at least on part of their surface, a low-density coating structure onto which a sufficient amount of nitrogen-containing compound can be adsorbed. This low-density coating structure is, for example, a porous structure formed by a product of reaction of a trifunctional silane coupling agent, such as a layer of $SiO_{2/3}CH_3$.

OH Group Content

The OH group content of the silica particles according to this exemplary embodiment may be 0.05 groups/nm$^2$ or more and 6 groups/nm$^2$ or less, preferably 0.1 groups/nm$^2$ or more and 5.5 groups/nm$^2$ or less, more preferably 0.15 groups/nm$^2$ or more and 5 groups/nm$^2$ or less, even more preferably 0.2 groups/nm$^2$ or more and 4 groups/nm$^2$ or less, still more preferably 0.2 groups/nm$^2$ or more and 3 groups/nm$^2$ or less.

The OH group content of the silica particles is measured by the Sears method as follows.

A 1.5-g sample of the silica particles is added to a mixture of 50 g of water and 50 g of ethanol, and the resulting mixture is stirred using an ultrasonic homogenizer for 2 minutes to give a liquid dispersion. In a 25° C. environment, 1.0 g of a 0.1 mol/L aqueous solution of hydrochloric acid is added dropwise with stirring to yield a test solution. The test solution is set into an automatic titrator, a potentiometric titration is performed with a 0.01 mol/L aqueous solution of sodium hydroxide, and the derivative of the titration curve is determined. Of the volumes of the 0.01 mol/L aqueous solution of sodium hydroxide at the inflection points at which the derivative of the titration curve is 1.8 or greater, the largest one is defined as E.

The density of silanol groups ρ (groups/nm$^2$) on the surface of the silica particles is calculated according to the equation below, and the calculated density is reported as the OH group content of the silica particles.

$$\rho=((0.01\times E-0.1)\times NA/1000)/(M\times S_{BET}\times 10^{18})$$

E, the largest of the volumes of the 0.01 mol/L aqueous solution of sodium hydroxide at the inflection points at which the derivative of the titration curve is 1.8 or greater; NA, the Avogadro constant; M, the amount of the silica particles (1.5 g); $S_{BET}$, the BET specific surface area (m$^2$/g) of the silica particles as measured by three-point nitrogen adsorption (relative pressure at equilibrium, 0.3).

Method for Producing the Silica Particles

An example of a method for producing the silica particles includes a first step, in which a coating structure of a product of reaction of a silane coupling agent is formed on at least part of the surface of base silica particles, and a second step, in which a nitrogen-containing compound is attached to the coating structure. This production method may further include a third step, in which base silica particles having the coating structure are hydrophobized, after or within the second step. These steps will now be described in detail.

Base Silica Particles

The base silica particles are prepared through, for example, step (i) below.

Step (i), base silica particles are formed by the sol-gel method to give a liquid suspension of the base silica particles.

Step (i) may be a sol-gel process including an alkaline catalyst solution preparation step, in which an alkaline catalyst solution is prepared as a solution of an alkaline catalyst in an alcohol-containing solvent, and a base silica particle formation step, in which a tetraalkoxysilane and an alkaline catalyst are fed into the alkaline catalyst solution to induce the formation of base silica particles.

The alkaline catalyst solution preparation step may be a step in which an alcohol-containing solvent is prepared and mixed with an alkaline catalyst to give an alkaline catalyst solution.

The alcohol-containing solvent may be an alcohol alone or a mixture of an alcohol and a non-alcoholic solvent. Examples of alcohols include lower alcohols, such as methanol, ethanol, n-propanol, isopropanol, and butanol. Examples of non-alcoholic solvents include water; ketones, such as acetone, methyl ethyl ketone, and methyl isobutyl ketone; cellosolves, such as methyl cellosolve, ethyl cellosolve, butyl cellosolve, and cellosolve acetate; and ethers, such as dioxanes and tetrahydrofuran. If the solvent is a mixture, the percentage of the alcohol may be 80% by mass or more, preferably 85% by mass or more.

The alkaline catalyst is a catalyst for accelerating the reactions of the tetraalkoxysilane (hydrolysis and condensation); it can be, for example, a basic catalyst such as ammonia, urea, or a monoamine, preferably ammonia.

The concentration of the alkaline catalyst in the alkaline catalyst solution may be 0.5 mol/L or more and 1.5 mol/L or less, preferably 0.6 mol/L or more and 1.2 mol/L or less, more preferably 0.65 mol/L or more and 1.1 mol/L or less.

The base silica particle formation step is a step in which a tetraalkoxysilane and an alkaline catalyst are separately fed into the alkaline catalyst solution, and the tetraalkoxysilane is allowed to react (hydrolyze and condense) in the alkaline catalyst solution to produce base silica particles.

In the base silica particle formation step, core particles form through reactions of the tetraalkoxysilane soon after the tetraalkoxysilane is fed (core particle formation stage), then these core particles grow (core particle growth stage), and the base silica particles form as a result.

The tetraalkoxysilane can be, for example, tetramethoxysilane, tetraethoxysilane, tetrapropoxysilane, or tetrabutoxysilane. Preferably, the tetraalkoxysilane is tetramethoxysilane or tetraethoxysilane for the control of the reaction rate or for uniformity in the shape of the resulting base silica particles.

The alkaline catalyst fed into the alkaline catalyst solution can be, for example, a basic catalyst such as ammonia, urea, or a monoamine, preferably ammonia. The alkaline catalyst fed together with the tetraalkoxysilane may be the same as or may be different from the alkaline catalyst that has already been contained in the alkaline catalyst solution, but preferably, the two alkaline catalysts are of the same type.

As for the feeding method for the feeding of each of the tetraalkoxysilane and the alkaline catalyst into the alkaline catalyst solution, the materials may be fed continuously or may be fed intermittently.

In the base silica particle formation step, the temperature of the alkaline catalyst solution (at the feeding of the materials thereinto) may be 5° C. or above and 50° C. or below, preferably 15° C. or above and 45° C. or below.

Through these steps, base silica particles are obtained.

A possible approach to obtaining silica particles with a peak at a pore diameter of 2 nm or less after baking at 350° C. (specifically, base silica particles having micropores in their surface) is to carry out the operation of reducing the water content of the alkaline catalyst solution in which particle formation is complete. In the base silica particle formation step, the water content of the alkaline catalyst solution at the completion of the feeding of the tetraalkoxysilane and the alkaline catalyst into the alkaline catalyst solution may be made 1% by mass or more and 16% by mass or less. The water content of the alkaline catalyst solution at the completion of the feeding of the tetraalkoxysilane and the alkaline catalyst may be 1% by mass or more and 10% by mass or less, preferably 1% by mass or more and 6% by mass or less.

In the base silica formation step, base silica particles form through reactions (hydrolysis and condensation) of a tetraalkoxysilane in an alkaline catalyst solution, and making the water content of the alkaline catalyst solution a percentage at which the hydrolysis of the tetraalkoxysilane is limited may help obtain base silica particles having micropores in their surface.

Specifically, the water content of the alkaline catalyst solution into which the tetraalkoxysilane has yet to be fed, the amount of the alkaline catalyst fed, and the water content of the alkaline catalyst are adjusted to control the hydrolysis of the tetraalkoxysilane.

Alternatively, for example, the alkaline catalyst concentration of the aqueous solution of an alkaline catalyst may be increased, or the amount of the solution fed may be reduced, halfway to feeding the tetraalkoxysilane and the alkaline catalyst into the alkaline catalyst solution. This may help confine the formation of micropores more to the surface of the base silica particles because in that case the hydrolysis of the tetraalkoxysilane may be limited in a later stage of the reactions of the tetraalkoxysilane.

First Step

The first step is, for example, a step in which a silane coupling agent is added to a liquid suspension of base silica particles, and the silane coupling agent is allowed to react on the surface of the base silica particles to produce a coating structure formed by the product of reaction of the silane coupling agent.

The reaction of the silane coupling agent is carried out by, for example, adding the silane coupling agent to the liquid suspension of base silica particles and then heating the suspension while stirring it. Specifically, for example, the suspension is heated to 40° C. or above and 70° C. or below, the silane coupling agent is added, and the resulting mixture is stirred. The duration of stirring may be 10 minutes or more and 24 hours or less, preferably 60 minutes or more and 420 minutes or less, more preferably 80 minutes or more and 300 minutes or less.

Second Step

The second step is a step in which a nitrogen-containing compound is attached to pores (mesopores) in the coating structure formed by a product of reaction of a silane coupling agent.

Through the second step, the nitrogen-containing compound is attached to the pores (mesopores) in the coating structure and also to micropores created in the base silica particles.

In the second step, for example, a nitrogen-containing compound is added to the liquid suspension of base silica particles after a complete reaction of the silane coupling agent, and the resulting mixture is stirred with its temperature kept in the range of 20° C. to 50° C. The nitrogen-containing compound may be added to the suspension of silica particles as a solution of the compound in an alcohol. The alcohol may be the same as or may be different from that in the suspension of base silica particles, but preferably the two alcohols are of the same type. In the alcohol solution of the nitrogen-containing compound, the concentration of the nitrogen-containing compound may be 0.05% by mass or more and 10% by mass or less, preferably 0.1% by mass or more and 6% by mass or less.

Third Step

The third step is a step in which a hydrophobized structure is attached to the coating structure formed by a product of reaction of a silane coupling agent. The third step is a hydrophobizing step performed after or during the second step. A hydrophobized layer is formed through a reaction between functional groups of a hydrophobizing agent and/or a reaction between a functional group of a hydrophobizing agent and OH groups of the base silica particles.

In the third step, for example, a nitrogen-containing compound is added to the liquid suspension of base silica particles after a complete reaction of the silane coupling agent, and then a hydrophobizing agent is added. The suspension may be stirred and heated during this. For example, the suspension is heated to 40° C. or above and 70° C. or below, the hydrophobizing agent is added, and the resulting mixture is stirred. The duration of stirring may be 10 minutes or more and 24 hours or less, preferably 20 minutes or more and 120 minutes or less, more preferably 20 minutes or more and 90 minutes or less.

Drying Step

After the second or third step is performed or while the second or third step is performed, a drying step in which the solvent is removed from the liquid suspension may be carried out. Examples of drying methods include thermal drying, spray drying, and supercritical drying.

Spray drying can be performed by known methods using a spray dryer (rotary disk, nozzle, etc.). For example, the suspension of silica particles is sprayed into a stream of hot air at a rate of 0.2 liters/hour or more and 1 liter/hour or less. The temperature of the hot air may be 70° C. or above and 400° C. or below at the inlet of the spray dryer and may be 40° C. or above and 120° C. or below at the outlet. Preferably, the temperature of the hot air at the inlet is 100° C. or above and 300° C. or below. The concentration of silica particles in the suspension of silica particles may be 10% by mass or more and 30% by mass or less.

In supercritical drying, the substance used as the supercritical fluid can be, for example, carbon dioxide, water, methanol, ethanol, or acetone. The supercritical fluid may be supercritical carbon dioxide for treatment efficiency reasons and for the control of the formation of coarse particles. A specific example of an operation performed in a step in which supercritical carbon dioxide is used is as follows.

The suspension is put into an airtight reaction vessel, liquid carbon dioxide is then introduced, and then the airtight reaction vessel is heated while the pressure inside the airtight reaction vessel is increased using a high-pressure pump to make the carbon dioxide in the airtight reaction vessel supercritical. Then liquid carbon dioxide is allowed to flow into the airtight reaction vessel, and the supercritical carbon dioxide is allowed to flow out of the airtight reaction vessel so that the supercritical carbon dioxide will pass through the suspension in the airtight reaction vessel. While the supercritical carbon dioxide passes through the suspension, the solvent dissolves in the supercritical carbon dioxide and is removed together with the supercritical carbon dioxide flowing out of the airtight reaction vessel. The temperature and pressure inside the airtight reaction vessel are a temperature and a pressure at which carbon dioxide turns supercritical. Since the critical point of carbon dioxide is 31.1° C. and 7.38 MPa, the temperature and pressure inside the airtight reaction vessel are set to, for example, 40° C. or above and 200° C. or below and 10 MPa or more and 30 MPa or less, respectively. The flow rate of the supercritical fluid into the airtight reaction vessel may be 80 mL/sec or more and 240 mL/sec or less.

The resulting silica particles may be disintegrated or screened so that coarse particles and aggregates will be removed. The disintegration is carried out using, for example, a dry mill, such as a jet mill, vibration mill, ball mill, or pin mill. The screening is carried out using, for example, a vibration sieve or air-jet sieve.

Toner for Developing an Electrostatic Charge Image

Toner according to this exemplary embodiment incorporates toner particles and silica particles as an external additive attached to the toner particles. The silica particles are silica particles according to the above exemplary embodiment.

Toner Particles

The toner particles contain, for example, a binder resin and optionally a coloring agent, a release agent, and other additives.

Binder Resin

Examples of binder resins include vinyl resins that are homopolymers of monomers such as styrenes (e.g., styrene, para-chlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene) and copolymers of two or more such monomers.

Non-vinyl resins, such as epoxy resins, polyester resins, polyurethane resins, polyamide resins, cellulose resins, polyether resins, and modified rosin, mixtures of any such resin and a vinyl resin, and graft copolymers obtained by polymerizing a vinyl monomer in the presence of any such non-vinyl resin may also be used.

One such binder resin may be used alone, or two or more may be used in combination.

The binder resin may be a polyester resin.

Examples of polyester resins include known polyester resins.

An example of a polyester resin is a polycondensate of a polycarboxylic acid and a polyhydric alcohol. The polyester resin may be a commercially available polyester resin or may be a synthesized polyester resin.

Examples of polycarboxylic acids include aliphatic dicarboxylic acids (e.g., oxalic acid, malonic acid, maleic acid, fumaric acid, citraconic acid, itaconic acid, glutaconic acid, succinic acid, alkenylsuccinic acids, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), and anhydrides and lower-alkyl (e.g., C1 to C5 alkyl) esters thereof. Of these, aromatic dicarboxylic acids, for example, are preferred.

A combination of a dicarboxylic acid with a carboxylic acid that has three or more carboxylic groups and can have a crosslinked or branched structure may also be used. Examples of carboxylic acids having three or more carboxylic groups include trimellitic acid, pyromellitic acid, and anhydrides and lower-alkyl (e.g., C1 to C5 alkyl) esters thereof.

One polycarboxylic acid may be used alone, or two or more may be used in combination.

Examples of polyhydric alcohols include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols, for example, are preferred, and aromatic diols are more preferred.

A combination of a diol with a polyhydric alcohol that has three or more hydroxyl groups and can have a crosslinked or branched structure may also be used. Examples of polyhydric alcohols having three or more hydroxyl groups include glycerol, trimethylolpropane, and pentaerythritol.

One polyhydric alcohol may be used alone, or two or more may be used in combination.

The glass transition temperature (Tg) of the polyester resin may be 50° C. or above and 80° C. or below, preferably 50° C. or above and 65° C. or below.

The glass transition temperature is determined from the DSC curve of the resin, which is obtained by differential scanning calorimetry (DSC), more specifically as the "extrapolated initial temperature of glass transition" described in the methods for determining glass transition temperatures set forth in JIS K7121-1987 "Testing Methods for Transition Temperatures of Plastics."

The weight-average molecular weight (Mw) of the polyester resin may be 5000 or more and 1000000 or less, preferably 7000 or more and 500000 or less.

The number-average molecular weight (Mn) of the polyester resin may be 2000 or more and 100000 or less.

The molecular weight distribution, Mw/Mn, of the polyester resin may be 1.5 or greater and 100 or less, preferably 2 or greater and 60 or less.

The weight- and number-average molecular weights are measured by gel permeation chromatography (GPC). The GPC measurement of molecular weights is performed using Tosoh's HLC-8120 GPC chromatograph and Tosoh's TSK-gel SuperHM-M column (15 cm) with THF as the eluate. The weight- and number-average molecular weights are calculated by comparing the results of the measurement with a molecular-weight calibration curve constructed using monodisperse polystyrene standards.

The polyester resin is obtained by a known production method. A specific example is to polymerize the starting monomers at a temperature of 180° C. or above and 230° C. or below, optionally under reduced pressure so that the water and alcohol produced with the condensation will leave.

If any starting monomer is insoluble or not miscible at the reaction temperature, a high-boiling solvent may be added as a solubilizer to make it soluble. The solubilizer, if used, is removed by distillation during the polycondensation. Any monomer not miscible may be condensed with the counterpart acid or alcohol before the polycondensation.

The binder resin content may be 40% by mass or more and 95% by mass or less, preferably 50% by mass or more and 90% by mass or less, more preferably 60% by mass or more and 85% by mass or less of the toner particles as a whole.

Coloring Agent

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes.

One coloring agent may be used alone, or two or more may be used in combination.

Surface-treated coloring agents may optionally be used, and a combination of a coloring agent and a dispersant may also be used. It is also possible to use multiple coloring agents in combination.

The coloring agent content may be 1% by mass or more and 30% by mass or less, preferably 3% by mass or more and 15% by mass or less, of the toner particles as a whole.

Release Agent

Examples of release agents include hydrocarbon waxes; natural waxes, such as carnauba wax, rice bran wax, and candelilla wax; synthesized or mineral/petroleum waxes, such as montan wax; and ester waxes, such as fatty acid esters and montanates. Other release agents may also be used.

The melting temperature of the release agent may be 50° C. or above and 110° C. or below, preferably 60° C. or above and 100° C. or below.

The melting temperature is determined from the DSC curve of the agent, which is obtained by differential scanning calorimetry (DSC), as the "peak melting temperature" described in the methods for determining melting temperatures set forth in JIS K7121-1987 "Testing Methods for Transition Temperatures of Plastics."

The release agent content may be 1% by mass or more and 20% by mass or less, preferably 5% by mass or more and 15% by mass or less, of the toner particles as a whole.

Other Additives

Examples of other additives include known additives, such as magnetic substances, charge control agents, and inorganic powders. Such additives are contained in the toner particles as internal additives.

Characteristics and Other Details of the Toner Particles

The toner particles may be single-layer toner particles or may be so-called core-shell toner particles, i.e., toner particles formed by a core (core particle) and a coating layer that covers the core (shell layer).

Core-shell toner particles may be formed by, for example, a core containing a binder resin and optionally additives, such as a coloring agent and a release agent, and a coating layer containing a binder resin.

The volume-average diameter (D50v) of the toner particles may be 2 μm or more and 10 μm or less, preferably 4 μm or more and 8 μm or less.

Average diameters and geometric standard deviations of the toner particles are measured using Coulter Multisizer II (Beckman Coulter) with ISOTON-II as the electrolyte (Beckman Coulter).

For measurement, a sample for measurement weighing 0.5 mg or more and 50 mg or less is put into 2 ml of a 5% by mass aqueous solution of a surfactant (e.g., a sodium alkylbenzene sulfonate) as a dispersant. The resulting mixture is added to 100 ml or more and 150 ml or less of the electrolyte.

The electrolyte with the sample suspended therein is sonicated for 1 minute using a sonicator, and the size distribution of particles having a diameter of 2 μm or more and 60 μm or less is measured using Coulter Multisizer II with an aperture size of 100 μm. The number of particles sampled is 50000.

Cumulative volume and number distributions are drawn by plotting the volume and the number of particles, each from the smallest diameter, against segments by size (channels) divided based on the measured particle size distribution, and the particle diameters at which the cumulative percentage is 16% are defined as volume-based diameter D16v and number-based diameter D16p of the particles, the particle diameters at which the cumulative percentage is 50% are defined as the volume-average diameter D50v and the cumulative number-average diameter D50p of the particles, and the particle diameters at which the cumulative percentage is 84% are defined as volume-based diameter D84v and number-based diameter D84p of the particles.

Using these, the geometric standard deviation by volume (GSDv) is calculated as $(D84v/D16v)^{1/2}$, and the geometric standard deviation by number (GSDp) is calculated as $(D84p/D16p)^{1/2}$.

The average circularity of the toner particles may be 0.94 or greater and 1.00 or less, preferably 0.95 or greater and 0.98 or less.

The average circularity of the toner particles is given by (equivalent circular circumference)/(circumference) [(the circumference of a circle having the same projected area as the image of the particle)/(the circumference of the projected image of the particle)]. Specifically, the average circularity of the toner particles is a value measured by the following method.

First, the toner particles of interest are sampled by aspiration in such a manner that it will form a flat stream, and this flat stream is photographed with a flash to capture the figures of the particles in a still image; then the average circularity is determined by analyzing the particle images using a flow particle-image analyzer (Sysmex FPIA-3000). The number of particles sampled in the determination of the average circularity is 3500.

If the toner contains an external additive, the toner (developer) of interest is dispersed in water containing a surfactant, and then the resulting dispersion is sonicated to give toner particles from which the external additive has been detached.

External Additives

The toner according to this exemplary embodiment contains silica particles according to the above exemplary embodiment as an external additive. The amount of the silica particles according to the above exemplary embodiment as an external additive may be 0.1 parts by mass or more and 3.0 parts by mass or less, preferably 0.2 parts by mass or more and 2.0 parts by mass or less, more preferably 0.3 parts by mass or more and 1.5 part by mass or less per 100 parts by mass of the toner particles.

The toner according to this exemplary embodiment may contain, as an external additive, silica particles other than silica particles according to the above exemplary embodiment. Such silica particles may be hydrophobic silica particles, which are produced by treating the surface of silica particles, such as particles of sol-gel, water-borne colloidal, alcoholic, fumed, or fused silica, with a hydrophobizing agent (e.g., a silane coupling agent, a silicone oil, a titanate coupling agent, an aluminum coupling agent, or a silazane compound).

If the toner according to this exemplary embodiment contains silica particles other than silica particles according to the above exemplary embodiment, the amount of the silica particles as an external additive may be 0.1 parts by mass or more and 3.0 parts by mass or less, preferably 0.2 parts by mass or more and 2.0 parts by mass or less, more preferably 0.3 parts by mass or more and 1.5 part by mass or less per 100 parts by mass of the toner particles.

The toner according to this exemplary embodiment may contain external additives other than silica particles according to the above exemplary embodiment. Examples of external additives other than silica particles include inorganic particles, such as particles of $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, $MgSO_4$, and $SrTiO_3$; hydrophobized inorganic particles produced by treating the surface of such inorganic particles with a hydrophobizing agent (e.g., a silane coupling agent, a silicone oil, a titanate coupling agent, an aluminum coupling agent, or a silazane compound); resin particles, such as particles of polystyrene, polymethyl methacrylate, and melamine resin; and active cleaning agents, such as metal salts of higher fatty acids, typically zinc stearate, and fluoropolymers.

Method for Producing the Toner

The toner according to this exemplary embodiment is obtained by producing the toner particles and then attaching the external additive to the toner particles.

The toner particles may be produced by a dry process (e.g., kneading and milling) or by a wet process (e.g., aggregation and coalescence, suspension polymerization, or dissolution and suspension). Any known dry or wet process may be used. Aggregation and coalescence, in particular, may be used to produce the toner particles.

Specifically, if the toner particles are produced by, for example, aggregation and coalescence, the toner particles are produced through:

a step of preparing a resin particle dispersion, which is a liquid dispersion of resin particles to serve as a binder resin (resin particle dispersion preparation step), a step of forming aggregates by causing the resin particles (and optionally other particles) to aggregate in the resin particle dispersion (optionally with other liquid dispersions of particles that have been mixed therein) (aggregate formation step), and a step of forming toner particles by heating the liquid dispersion of aggregates, or the aggregate dispersion, to cause the aggregates to fuse and coalesce together (fusion and coalescence step).

The details of the individual steps will now be described.

The following description is about a method for obtaining toner particles containing coloring and release agents, but the use of coloring and release agents is optional. Naturally, other additives, other than coloring and release agents, may also be used.

Resin Particle Dispersion Preparation Step

A resin particle dispersion, which is a liquid dispersion of resin particles to serve as a binder resin, is prepared together with, for example, a coloring agent particle dispersion, which is a liquid dispersion of particles of a coloring agent, and a release agent particle dispersion, which is a liquid dispersion of particles of a release agent.

The resin particle dispersion is prepared by, for example, dispersing the resin particles in a dispersion medium with a surfactant.

An example of a dispersion medium used in the resin particle dispersion is an aqueous medium.

Examples of aqueous media include types of water, such as distilled water and deionized water, and alcohols. One such medium may be used alone, or two or more may be used in combination.

Examples of surfactants include anionic surfactants, such as salts of sulfates, salts of sulfonic acid, esters of phosphoric acid, and soap surfactants; cationic surfactants, such as amine salts and quaternary ammonium salts; and nonionic surfactants, such as polyethylene glycol surfactants, ethylene oxide adducts of alkylphenols, and polyhydric alcohols. In particular, anionic and cationic surfactants are typical examples. Nonionic surfactants may be used in combination with an anionic or cationic surfactant.

One surfactant may be used alone, or two or more may be used in combination.

In preparing the resin particle dispersion, examples of methods for dispersing the resin particles in the dispersion medium include common dispersion methods, such as a rotary-shear homogenizer and a ball mill, sand mill, Dyno-Mill, and other medium mills. Certain types of resin particles may be dispersed in the dispersion medium by phase inversion emulsification. Phase inversion emulsification is a method for dispersing particles of a resin in an aqueous medium in which the resin to be dispersed is dissolved in a hydrophobic organic solvent in which the resin is soluble, the organic continuous phase (O phase) is neutralized by adding a base, and then the aqueous medium (W phase) is put into the solution to invert the phases from W/O into O/W.

The volume-average diameter of the resin particles to be dispersed in the resin particle dispersion may be 0.01 μm or more and 1 μm or less for example, preferably 0.08 μm or more and 0.8 μm or less, more preferably 0.1 μm or more and 0.6 μm or less.

The volume-average diameter of the resin particles is measured using a particle size distribution obtained through measurement with a laser-diffraction particle size distribution analyzer (e.g., HORIBA LA-700); the distribution obtained is divided into segments by particle size (channels), the cumulative volume distribution is plotted starting from the smallest diameter, and the particle diameter at which the cumulative percentage is 50% of all particles is reported as the volume-average diameter D50v of the particles. The volume-average diameter of particles in the other liquid dispersions is also measured likewise.

The amount of the resin particles in the resin particle dispersion may be 5% by mass or more and 50% by mass or less, preferably 10% by mass or more and 40% by mass or less.

In the same manner as the resin particle dispersion, a coloring agent particle dispersion and a release agent particle dispersion, for example, are also prepared. That is, what is described about the volume-average diameter of particles, dispersion medium, the dispersing method, and the amount of particles in relation to the resin particle dispersion also applies to the particles of a coloring agent dispersed in the coloring agent particle dispersion and the particles of a release agent dispersed in the release agent particle dispersion.

Aggregate Formation Step

Then the resin particle dispersion, the coloring agent particle dispersion, and the release agent particle dispersion are mixed together.

In the resulting dispersion mixture, the resin particles, the coloring agent particles, and the release agent particles are allowed to aggregate (heteroaggregation) to produce aggregates including resin particles, coloring agent particles, and release agent particles and having a diameter close to the intended diameter of the finished toner particles.

A specific example of a method for this is to add a flocculant to the dispersion mixture, adjust the pH of the mixture to an acidic level (e.g., 2 or higher and 5 or lower) at the same time, optionally add a dispersion stabilizer, and then heat the mixture to a temperature near the glass transition temperature of the resin particles (a specific example being a temperature higher than or equal to the glass transition temperature of the resin particles minus 30° C. but not higher than the glass transition temperature of the resin particles minus 10° C.) to cause the particles dispersed in the mixture to combine into aggregates. In the aggregate formation step, for example, the flocculant may be added to the dispersion mixture at room temperature (e.g., 25° C.) with stifling with a rotary-shear homogenizer, the pH of the mixture may be adjusted to an acidic level (e.g., 2 or higher and 5 or lower), and then the mixture may be heated optionally with an added dispersion stabilizer therein.

The flocculant can be, for example, a surfactant having the opposite polarity to the surfactant contained in the dispersion mixture, an inorganic metal salt, or a divalent or higher-valency metal complex. Using a metal complex as a flocculant may improve charging characteristics because in that case the amount of surfactant used may be smaller.

Optionally, an additive that forms a complex or otherwise binds with metal ions derived from the flocculant may be used. An example is a chelating agent.

Examples of inorganic metal salts include metal salts such as calcium chloride, calcium nitrate, barium chloride, magnesium chloride, zinc chloride, aluminum chloride, and aluminum sulfate; and polymers of inorganic metal salts, such as polyaluminum chloride, polyaluminum hydroxide, and calcium polysulfide.

The chelating agent may be a water-soluble chelating agent. Examples of chelating agents include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent may be 0.01 parts by mass or more and 5.0 parts by mass or less, preferably 0.1 parts by mass or more and less than 3.0 parts by mass, per 100 parts by mass of the resin particles.

Fusion and Coalescence Step

Then the resulting liquid dispersion of aggregates, or the aggregate dispersion, is heated, for example to a temperature equal to or higher than the glass transition temperature of the resin particles (e.g., the glass transition temperature of the resin particles plus 10° C. to 30° C.), to cause the aggregates to fuse and coalesce into toner particles.

Through these steps, toner particles are obtained.

After the liquid dispersion of aggregates, or the aggregate dispersion, is obtained, the toner particles may be produced through a step of forming second aggregates by further mixing the aggregation dispersion and the resin particle dispersion, which is a liquid dispersion of resin particles, together and causing the resin particles to combine together on the surface of the aggregates and a step of heating the resulting liquid dispersion of second aggregates, or the second aggregate dispersion, to cause the second aggregates to fuse and coalesce into core-shell toner particles.

After the end of the fusion and coalescence step, the toner particles in the liquid dispersion are subjected to known washing, solid-liquid separation, and drying steps to give dry toner particles. The washing step may include a sufficient degree of displacement washing with deionized water for chargeability reasons. The solid-liquid separation step may include suction filtration or pressure filtration, for example, for productivity reasons. The drying step may include lyophilization, flash drying, fluidized drying, or vibrating fluidized drying, for example, for productivity reasons.

Then the toner according to this exemplary embodiment is produced, for example by adding the external additive to the resulting dry toner particles and mixing them together. The mixing may be carried out using, for example, a V-blender, Henschel mixer, or Lodige mixer. Optionally, coarse particles in the toner may be removed, for example using a vibrating sieve or air-jet sieve.

Electrostatic Charge Image Developer

An electrostatic charge image developer according to an exemplary embodiment includes at least toner according to the above exemplary embodiment.

The electrostatic charge image developer according to this exemplary embodiment may be a one-component developer, which is substantially toner according to the above exemplary embodiment, or may be a two-component developer, which is a mixture of the toner and a carrier.

The carrier can be any carrier, and examples include known carriers. Examples of carriers include a coated carrier, formed by a core magnetic powder and a coating resin on its surface; a magnetic powder-dispersed carrier, formed by a matrix resin and a magnetic powder dispersed therein; and a resin-impregnated carrier, which is a porous magnetic powder impregnated with resin.

The magnetic powder-dispersed and resin-impregnated carriers may be carriers formed by the particles forming the carrier as a core and a resin coating on the core.

The magnetic powder can be, for example, a powder of a magnetic metal, such as iron, nickel, or cobalt; or a powder of a magnetic oxide, such as ferrite or magnetite.

Examples of resins for coating and matrix resins include polyethylene, polypropylene, polystyrene, polyvinyl acetate, polyvinyl alcohol, polyvinyl butyral, polyvinyl chloride, polyvinyl ethers, polyvinyl ketones, vinyl chloride-vinyl acetate copolymers, styrene-acrylate copolymers, straight silicone resins, having organosiloxane bonds therein, and their modified forms, fluoropolymers, polyesters, polycarbonates, phenolic resins, and epoxy resins. The resin for coating and the matrix resin may contain additives, such as electrically conductive particles. Examples of electrically conductive particles include particles of metals, such as gold, silver, and copper, and particles of carbon black, titanium oxide, zinc oxide, tin oxide, barium sulfate, aluminum borate, potassium titanate, etc.

An example of a method for coating the surface of the core with resin is to coat the surface with a solution in which the resin for coating and additives (optional) are dissolved in a solvent, or a coating-layer formation solution. The solvent can be any solvent and can be selected considering, for example, the resin used and its suitability for coating.

Specific examples of methods for resin coating include dipping, in which the core is dipped into the coating-layer formation solution; spraying, in which the coating-layer formation solution is sprayed onto the surface of the core; fluidized bed coating, in which the coating-layer formation solution is sprayed onto a core floated in fluidized air; and kneader-coater coating, in which the carrier core and the coating-layer formation solution are mixed together in a kneader-coater, followed by the removal of the solvent.

The mix ratio (by mass) between the toner and the carrier in a two-component developer may be from 1:100 (toner: carrier) to 30:100, preferably from 3:100 to 20:100.

Image Forming Apparatus and Image Forming Method

An image forming apparatus and an image forming method according to exemplary embodiments will now be described.

An image forming apparatus according to an exemplary embodiment includes an image carrier; a charging component that charges the surface of the image carrier; an electrostatic charge image creating component that creates an electrostatic charge image on the charged surface of the image carrier; a developing component that contains an electrostatic charge image developer and develops, using the electrostatic charge image developer, the electrostatic charge image on the surface of the image carrier to form a toner image; a transfer component that transfers the toner image on the surface of the image carrier to the surface of a recording medium; and a fixing component that fixes the toner image on the surface of the recording medium. The electrostatic charge image developer is an electrostatic charge image developer according to the above exemplary embodiment.

The image forming apparatus according to this exemplary embodiment implements an image forming method that includes a charging step, in which the surface of an image carrier is charged; an electrostatic charge image creation step, in which an electrostatic charge image is created on the charged surface of the image carrier; a development step, in which the electrostatic charge image on the surface of the image carrier is developed into a toner image using an electrostatic charge image developer according to the above exemplary embodiment; a transfer step, in which the toner image on the surface of the image carrier is transferred to the surface of a recording medium; and a fixation step, in which the toner image on the surface of the recording medium is fixed (image forming method according to an exemplary embodiment).

The structure of the image forming apparatus according to this exemplary embodiment can be applied to known types of image forming apparatuses, including a direct-transfer image forming apparatus, which forms a toner image on the surface of an image carrier and transfers it directly to a recording medium; an intermediate-transfer image forming apparatus, which forms a toner image on the surface of an image carrier, transfers it to the surface of an intermediate transfer body (first transfer), and then transfers the toner image on the surface of the intermediate transfer body to the surface of a recording medium (second transfer); an image forming apparatus having a cleaning component that cleans the surface of the image carrier between the transfer of the toner image and charging; and an image forming apparatus having a static eliminator that removes static electricity from the surface of the image carrier by irradiating the surface with antistatic light between the transfer of the toner image and charging.

If an image forming apparatus according to this exemplary embodiment is of intermediate-transfer type, its transfer component includes, for example, an intermediate transfer body, the surface of which is for a toner image to be transferred to; a first transfer component, which transfers the toner image formed on the surface of the image carrier to the surface of the intermediate transfer body (first transfer); and a second transfer component, which transfers the toner image on the surface of the intermediate transfer body to the surface of a recording medium (second transfer).

Part of the image forming apparatus according to this exemplary embodiment, such as a portion including the developing component, may have a cartridge structure, a structure that allows the part to be detached from and attached to the image forming apparatus (or may be a process cartridge). An example of a process cartridge is a process cartridge that includes a developing component containing an electrostatic charge image developer according to the above exemplary embodiment.

An example of an image forming apparatus according to this exemplary embodiment will now be presented; the apparatus, however, is not limited to the example below. Some of its structural elements will be described with reference to a drawing.

FIG. 1 is a schematic diagram illustrating the structure of an image forming apparatus according to this exemplary embodiment.

The image forming apparatus illustrated in FIG. 1 includes first to fourth electrophotographic image forming units 10Y, 10M, 10C, and 10K (image forming component), which produce images in the colors of yellow (Y), magenta (M), cyan (C), and black (K), respectively, based on color-separated image data. These image forming units (hereinafter also referred to simply as "units") 10Y, 10M, 10C, and 10K are arranged in a horizontal row with a predetermined distance therebetween. The units 10Y, 10M, 10C, and 10K may be process cartridges; the units may be detachable from and attachable to the image forming apparatus.

Above the units 10Y, 10M, 10C, and 10K, an intermediate transfer belt (example of an intermediate transfer body) 20 extends through each unit. The intermediate transfer belt 20 is wound over a drive roller 22 and a support roller 24 and runs in the direction from the first unit 10Y toward the fourth unit 10K. The support roller 24 is urged by a spring or similar mechanism, not illustrated in the drawing, away from the drive roller 22 to place tension on the intermediate transfer belt 20 wound over the two rollers. There is an intermediate transfer medium cleaner 30 by the image-carrying surface of the intermediate transfer belt 20, facing the drive roller 22.

Developing devices (example of a developing component) 4Y, 4M, 4C, and 4K in the units 10Y, 10M, 10C, and 10K are supplied with yellow, magenta, cyan, and black toners, respectively, contained in toner cartridges 8Y, 8M, 8C, and 8K.

The first to fourth units 10Y, 10M, 10C, and 10K are equivalent in structure and operation; in the following, therefore, the first unit 10Y, located upstream of the others in the direction of running of the intermediate transfer belt 20 and configured to produce a yellow image, will be described on behalf of the four.

The first unit 10Y has a photoreceptor 1Y that acts as an image carrier. Around the photoreceptor 1Y are a charging roller (example of a charging component) 2Y, which charges the surface of the photoreceptor 1Y to a predetermined potential; an exposure device (example of an electrostatic charge image creating component) 3, which irradiates the charged surface with a laser beam 3Y generated based on a color-separated image signal to create an electrostatic charge image there; a developing device (example of a developing component) 4Y, which supplies charged toner to the electrostatic charge image to develop the electrostatic charge image; a first transfer roller (example of a first transfer component) 5Y, which transfers the developed toner image to the intermediate transfer belt 20; and a photoreceptor cleaner (example of a cleaning component) 6Y, which removes residual toner off the surface of the photoreceptor 1Y after the first transfer, arranged in this order.

The first transfer roller 5Y is inside the intermediate transfer belt 20 and is positioned to face the photoreceptor 1Y. The first transfer roller 5Y, 5M, 5C, or 5K in each unit is connected to a bias power supply (not illustrated), which applies a first transfer bias to the roller. Each bias power supply is controlled by a controller, not illustrated in the drawing, to change the value of the transfer bias applied by the bias power supply to the corresponding first transfer roller.

The operation in the formation of a yellow image at the first unit 10Y will now be described.

First, before the operation, the surface of the photoreceptor 1Y is charged by the charging roller 2Y to a potential of −600 V to −800 V.

The photoreceptor 1Y includes an electrically conductive substrate (e.g., having a volume resistivity at 20° C. of $1\times10^{-6}$ Ω·cm or less) and a photosensitive layer placed thereon. This photosensitive layer has high electrical resistance (the resistance of a typical resin) in its normal state, but once it is irradiated with a laser beam, the resistivity of the irradiated portion changes. Thus, a laser beam 3Y is emitted from the exposure device 3 onto the charged surface of the photoreceptor 1Y according to image data for yellow sent from a controller, not illustrated in the drawing. As a result, an electrostatic charge image of a yellow image pattern is created on the surface of the photoreceptor 1Y.

The electrostatic charge image is an image created on the surface of the photoreceptor 1Y by electrical charging and is a so-called negative latent image; it is created as a result of the charge on the surface of the photoreceptor 1Y flowing away in the irradiated portion of the photosensitive layer in response to a resistivity decrease caused by the exposure to the laser beam 3Y while staying in the portion not irradiated with the laser beam 3Y.

The electrostatic charge image created on the photoreceptor 1Y rotates to a predetermined development point as the photoreceptor 1Y runs. At this development point, the electrostatic charge image on the photoreceptor 1Y is developed into a toner image, or visualized, by the developing device 4Y.

Inside the developing device 4Y is an electrostatic charge image developer that contains, for example, at least yellow toner and a carrier. The yellow toner is on a developer roller (example of a developer carrier) and has been triboelectrically charged with the same polarity as the charge on the photoreceptor 1Y (negative) through stifling inside the developing device 4Y. As the surface of the photoreceptor 1Y passes through the developing device 4Y, the yellow toner electrostatically adheres to the uncharged, latent-image area of the surface of the photoreceptor 1Y, and the latent image is developed by the yellow toner. The photoreceptor 1Y, now having a yellow toner image thereon, continues running at a predetermined speed, and the toner image developed thereon is transported to a predetermined first transfer point.

After the transport of the yellow toner image on the photoreceptor 1Y to the first transfer point, a first transfer bias is applied to the first transfer roller 5Y, and an electrostatic force acts on the toner image in the direction from the photoreceptor 1Y toward the first transfer roller 5Y to cause the toner image to be transferred from the photoreceptor 1Y to the intermediate transfer belt 20. The applied transfer bias has the (+) polarity, opposite the polarity of the toner (−), and its amount has been controlled, for example to +10 μA for the first unit 10Y, by a controller (not illustrated).

Residual toner on the photoreceptor 1Y is removed and collected at the photoreceptor cleaner 6Y.

The first transfer biases applied to the first transfer rollers 5M, 5C, and 5K in the second, third, and fourth units 10M, 10C, and 10K have also been controlled in the same manner as that for the first unit 10Y.

The intermediate transfer belt 20 to which a yellow toner image has been transferred at the first unit 10Y in this manner is then transported through the second to fourth units 10M, 10C, and 10K sequentially; as a result, toner images in the respective colors are overlaid to complete multilayer transfer.

The intermediate transfer belt 20 that has passed through the first to fourth units and thereby completed multilayer transfer of toner images in four colors then reaches a second transfer section, which is a section formed by the intermediate transfer belt 20, the support roller 24, which touches the inner surface of the intermediate transfer belt 20, and a second transfer roller (example of a second transfer component) 26, which is located by the image-carrying surface of the intermediate transfer belt 20. Recording paper (example of a recording medium) P is fed to the point of contact between the second transfer roller 26 and the intermediate transfer belt 20 in a timed manner by a feeding mechanism, and a second transfer bias is applied to the support roller 24. The applied transfer bias has the (−) polarity, the same as the polarity of the toner (−), and an electrostatic force acts on the toner image in the direction from the intermediate transfer belt 20 toward the recording paper P to cause the toner image to be transferred from the intermediate transfer belt 20 to the recording paper P. The amount of the second transfer bias is determined according to resistance detected by a resistance detector (not illustrated) configured to detect the electrical resistance of the second transfer section and has been controlled.

After that, the recording paper P is delivered to the point of pressure contact (nip) between a pair of fixing rollers at a fixing device (example of a fixing component) 28, and the toner image is fixed on the recording paper P there to give a fixed image.

The recording paper P to which the toner image is transferred can be, for example, ordinary printing paper for copiers, printers, etc., of electrophotographic type. Besides recording paper P, OHP sheets, for example, are also examples of recording media that may be used.

The use of recording paper P having a smooth surface may help further improve the smoothness of the surface of the fixed image; for example, coated paper, which is paper with a resin or other coating on its surface, or art paper for printing may be used.

The recording paper P with a completely fixed color image thereon is transported to an ejection section to finish the operation of forming a color image.

Process Cartridge and Toner Cartridge

A process cartridge according to an exemplary embodiment will now be described.

A process cartridge according to this exemplary embodiment is a process cartridge attachable to and detachable from an image forming apparatus and includes a developing component that contains an electrostatic charge image developer according to the above exemplary embodiment and develops, using the electrostatic charge image developer, an electrostatic charge image created on the surface of an image carrier to form a toner image.

The structure of the process cartridge according to this exemplary embodiment does not need to be as described above; the process cartridge may include the developing component and optionally at least one selected from other components, such as an image carrier, a charging component, an electrostatic charge image creating component, and a transfer component.

An example of a process cartridge according to this exemplary embodiment will now be presented; the cartridge, however, is not limited to the example below. Some of its structural elements will be described with reference to a drawing.

Figure 2:
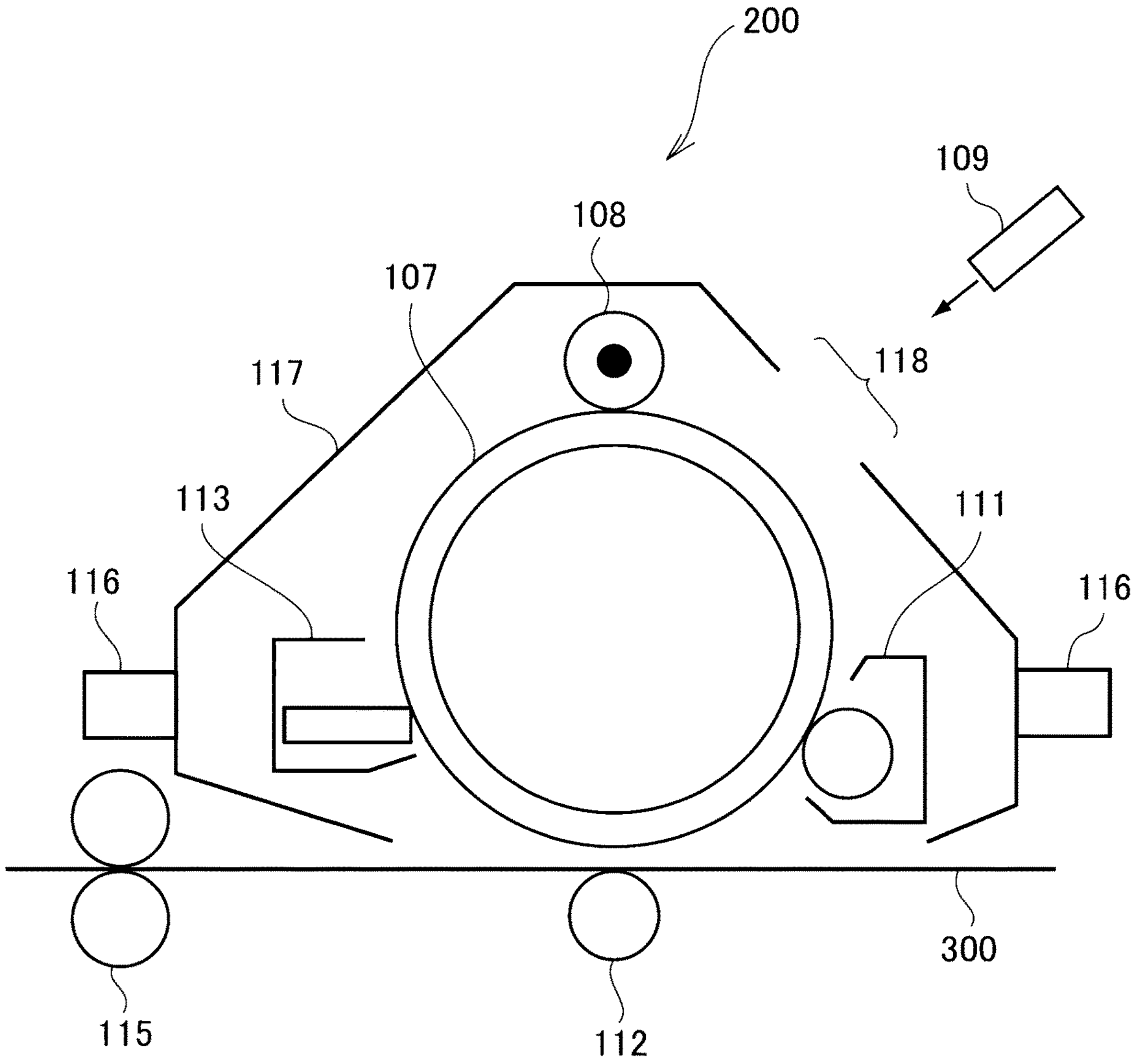
FIG. 2 is a schematic diagram illustrating the structure of an example of a process cartridge, according to an exemplary embodiment, attachable to and detachable from an image forming apparatus.

FIG. 2 is a schematic diagram illustrating the structure of a process cartridge according to this exemplary embodiment.

The process cartridge 200 illustrated in FIG. 2 is a cartridge containing, for example, a photoreceptor 107 (example of an image carrier) and a charging roller 108 (example of a charging component), a developing device 111 (example of a developing component), and a photoreceptor cleaner 113 (example of a cleaning component) arranged around the photoreceptor 107, all held together in a housing 117 having attachment rails 116 and an opening 118 for exposure to light.

FIG. 2 also illustrates an exposure device (example of an electrostatic charge image creating component) 109, a transfer device (example of a transfer component) 112, a fixing device (example of a fixing component) 115, and recording paper (example of a recording medium) 300.

A toner cartridge according to an exemplary embodiment will now be described.

A toner cartridge according to this exemplary embodiment is a toner cartridge that contains toner according to the above exemplary embodiment and is attachable to and detachable from an image forming apparatus. A toner cartridge is a cartridge that contains replenishment toner to be supplied to a developing component placed inside an image forming apparatus.

The image forming apparatus illustrated in FIG. 1 includes toner cartridges 8Y, 8M, 8C, and 8K detachable from and attachable to it, and the developing devices 4Y, 4M, 4C, and 4K are connected to their corresponding toner cartridges (or the toner cartridges for their respective colors) by toner supply tubing, not illustrated in the drawing. When there is little toner remaining in a toner cartridge, this toner cartridge is replaced.

EXAMPLES

Exemplary embodiments of the present disclosure will now be described in detail by examples; exemplary embodiments of the present disclosure, however, are not limited to these examples.

In the following description, "parts" and "%" are by mass unless stated otherwise.

The procedures described below, such as synthesis, treatment, and production, are carried out at room temperature (25° C.±3° C.) unless stated otherwise.

Examples 1 to 29, Comparative Examples 1 and 2, and Reference Examples 1 and 2

Particle Formation Step

According to the conditions indicated in Table 1, methanol (MeOH), deionized water, and aqueous ammonia (aqueous $NH_4OH$) are put into a glass reaction vessel having a metal stirrer bar, a dripping nozzle, and a thermometer and mixed together by stirring to give an alkaline catalyst solution.

Then the temperature of the alkaline catalyst solution is adjusted to 40° C., and the alkaline catalyst solution is purged with nitrogen. Then, according to the conditions indicated in Table 1, tetramethoxysilane (TMOS) and aqueous ammonia (aqueous $NH_4OH$) are simultaneously added dropwise while the alkaline catalyst solution is stirred, giving a liquid suspension of base silica particles.

The water content of the liquid suspension of base silica particles after the formation of the particles (i.e., at the completion of the feeding of the tetraalkoxysilane and the alkaline catalyst) (simply "After particle formation/Water content" in the table) is presented.

Coating Step

While the liquid suspension of base silica particles is heated to 40° C. and stirred, the silane coupling agent indicated in Table 1 is added to the suspension. Then stirring is continued for 120 minutes to allow the silane coupling agent to react. Through this, a coating structure is formed.

The silane coupling agent is added to make its amount in parts per 100 parts by mass, on a solids basis, of the liquid suspension of base silica particles as in Table 1.

Attachment Step

An alcohol solution is prepared in which the nitrogen-containing compound indicated in Table 1 (N compound in the table) has been diluted with butanol.

Then the alcohol solution in which a nitrogen-containing compound has been diluted with butanol is added to the suspension. The addition of the alcohol solution is carried out in such a manner that the number of parts of the nitrogen-containing compound will be as in Table 1 per 100 parts by mass, on a solids basis, of the liquid suspension of base silica particles. Then the resulting mixture is stirred for 100 minutes at 30° C. to give a liquid suspension containing a nitrogen-containing compound.

Drying Step

Subsequently, the suspension is transferred into a reactor, $CO_2$ is introduced while the suspension is stirred, and the inside of the reactor is heated and pressurized to a temperature of 150° C. and a pressure of 15 MPa, respectively. While the suspension is stirred with the temperature and pressure maintained, $CO_2$ is allowed to flow into and out of the reactor at a flow rate of 5 L/min. Then the solvent is removed over 120 minutes; the products are silica particles of the Examples and the Comparative Examples.

Measurement of Characteristics of the Silica Particles

The following characteristics of the resulting silica particles are measured by the measurement methods described above.

- The volume C of pores having a diameter of 2 nm or less determined from a pore size distribution curve obtained by nitrogen gas adsorption before baking at 350° C. ("Pore volume C before baking at 350° C." in the table)
- The volume D of pores having a diameter of 2 nm or less determined from a pore size distribution curve obtained by nitrogen gas adsorption after baking at 350° C. ("Pore volume D after baking at 350° C." in the table)
- The volume A of pores having a diameter of 2 nm or more and 25 nm or less determined from a pore size distribution curve obtained by nitrogen gas adsorption before baking at 350° C. ("Pore volume A before baking at 350° C." in the table)
- The volume B of pores having a diameter of 2 nm or more and 25 nm or less determined from a pore size distribution curve obtained by nitrogen gas adsorption after baking at 350° C. ("Pore volume B after baking at 350° C." in the table)
- Nitrogen content of the silica particles (N compound content in the table)
- The number-average diameter of the particles ("Particle size" in the table)

It should be noted that a pore size distribution curve obtained by nitrogen gas adsorption of the silica particles of the Examples and the Reference Examples after baking at 350° C. has at least one peak at a pore diameter of 2 nm or less and at least one peak at a pore diameter of more than 2 nm and 50 nm or less.

Evaluation of Charge Build-Up

The silica particles of the Examples, the Comparative Examples, and the Reference Examples are mixed with resin particles (e.g., particles of a crosslinked acrylic resin; Nippon Shokubai, MA1010) to give a mixture of the resin particles and the silica particles adhering to their surface to a coverage of 25%. Then 10 parts by mass of the mixture and 100 parts by mass of a ferrite powder (e.g., JFE Chemical, KNI106GSM), a total of 15 g, are put into a 60-ml glass bottle and weighed, and this bottle is left under high-temperature and high-humidity conditions (temperature of 27° C. and a relative humidity of 85%) for 1 day.

Then the mixture and ferrite powder in the bottle are put into a TURBULA shaker/mixer (e.g., Shinmaru Enterprises Corporation, T2F) and stirred at a mixing speed of 49 rpm. Samples stirred for 5 seconds, 10 seconds, 30 seconds, 60 seconds, 120 seconds, and 300 seconds are obtained, and the amount of charge on each sample is measured. The measurement of charge is carried out by putting the stirred mixture into a metal container capped with a 20-μm mesh stainless-steel gauze and measuring charge using a blow-off charge measurement system (Toshiba Chemical, TB-200).

Then the time at which the charge saturates is evaluated as the time taken by the silica particles to be charged. For example, when the difference between the amount of charge on the sample stirred for 5 seconds and that on the sample stirred for 10 seconds is within the range of ±2 μC/g, the time taken by the silica particles to be charged is 5 seconds.

The details of the abbreviations in Table 1 are as follows.

MTMS: Methyltrimethoxysilane

TP-415: $[N^+(CH)_3(C_{14}C_{29})_2]_4Mo_8O_{28}{}^{4-}$ (Hodogaya Chemical, N,N-Dimethyl-N-tetradecyl-1-tetradecanaminium, hexa-μ-oxotetra-μ3-oxodi-μ5-oxotetradecaoxooctamolybdate(4-) (4:1) (amount X extracted into an ammonia/methanol mixture=61% to 89% by mass, ratio X/Y between amount X and the amount Y extracted into water=0.03 to 0.26)

P-51: Benzyltrimethylammonium chloride

TMBAC: Benzyltributylammonium chloride

TABLE 1

| | Particle formation step | | | | | | | | Coating step | | | |
|---|---|---|---|---|---|---|---|---|---|---|---|---|
| | Alkaline catalyst solution | | | | Dropwise addition | | | After particle formation Water content of the suspension | Silane coupling agent | | Attachment step N compound | |
| | | | Aqueous $NH_4OH$ | | | Aqueous $NH_4OH$ | | | | | | |
| | MeOH Parts | Water Parts | Concentration, % | Parts | TMOS Parts | Concentration, % | Parts | % | Species | Parts | Species | Parts |
| Example 1 | 320 | 13 | 25 | 21 | 176 | 15 | 38 | 3 | MTMS | 6.9 | TP415 | 2.6 |
| Example 2 | 320 | 13 | 25 | 21 | 176 | 15 | 115 | 13 | MTMS | 34.5 | TP415 | 1.7 |

TABLE 1-continued

| | | | | | | | | | | | |
|---|---|---|---|---|---|---|---|---|---|---|---|
| Example 3 | 320 | 13 | 25 | 21 | 176 | 15 | 38 | 3 | MTMS | 6.9 | TP415 | 2.4 |
| Example 4 | 320 | 13 | 25 | 21 | 176 | 15 | 38 | 3 | MTMS | 69.0 | TP415 | 3.5 |
| Example 5 | 320 | 13 | 25 | 21 | 176 | 15 | 38 | 3 | MTMS | 34.5 | TP415 | 3.5 |
| Example 6 | 320 | 13 | 25 | 21 | 176 | 15 | 18 | 0.5 | MTMS | 34.5 | TP415 | 3.5 |
| Example 7 | 320 | 13 | 25 | 21 | 176 | 15 | 32 | 3 | MTMS | 3.5 | TP415 | 2.1 |
| Example 8 | 320 | 13 | 25 | 21 | 176 | 15 | 18 | 0.5 | MTMS | 4.8 | TP415 | 2.8 |
| Example 9 | 320 | 13 | 25 | 21 | 176 | 15 | 18 | 0.5 | MTMS | 3.5 | TP415 | 2.1 |
| Example 10 | 320 | 13 | 25 | 21 | 176 | 15 | 115 | 13 | MTMS | 3.5 | TP415 | 1.4 |
| Example 11 | 320 | 13 | 25 | 21 | 176 | 15 | 18 | 0.5 | MTMS | 20.7 | TP415 | 3.5 |
| Example 12 | 320 | 13 | 25 | 21 | 176 | 15 | 38 | 3 | MTMS | 6.9 | TP415 | 0.1 |
| Example 13 | 320 | 13 | 25 | 21 | 176 | 15 | 38 | 3 | MTMS | 13.8 | TP415 | 3.5 |
| Example 14 | 320 | 13 | 25 | 21 | 176 | 15 | 38 | 3 | MTMS | 13.8 | TP415 | 8.7 |
| Example 15 | 320 | 13 | 25 | 21 | 176 | 15 | 93 | 10 | MTMS | 6.9 | TP415 | 7.6 |
| Example 16 | 320 | 13 | 25 | 21 | 176 | 15 | 93 | 10 | MTMS | 6.9 | TP415 | 1.4 |
| Example 17 | 320 | 13 | 25 | 21 | 176 | 15 | 87 | 11 | MTMS | 10.4 | TP415 | 1.0 |
| Example 18 | 320 | 13 | 25 | 21 | 176 | 15 | 38 | 3 | MTMS | 13.8 | TP415 | 6.9 |
| Example 19 | 320 | 13 | 25 | 21 | 176 | 15 | 93 | 10 | MTMS | 6.9 | TP415 | 0.7 |
| Example 20 | 320 | 13 | 25 | 21 | 176 | 15 | 38 | 3 | MTMS | 6.9 | TP415 | 6.9 |
| Example 21 | 320 | 13 | 25 | 21 | 176 | 15 | 38 | 3 | MTMS | 6.9 | TP415 | 6.9 |
| Example 22 | 320 | 13 | 25 | 21 | 176 | 15 | 38 | 3 | MTMS | 6.9 | TP415 | 1.4 |
| Example 23 | 320 | 13 | 25 | 21 | 176 | 15 | 38 | 3 | MTMS | 6.9 | TP415 | 1.4 |
| Example 24 | 320 | 13 | 25 | 21 | 176 | 15 | 38 | 3 | MTMS | 6.9 | P-51 | 0.7 |
| Example 25 | 320 | 13 | 25 | 21 | 176 | 15 | 38 | 3 | MTMS | 6.9 | TMBAC | 6.9 |
| Example 26 | 320 | 13 | 25 | 21 | 176 | 15 | 38 | 3 | MTMS | 6.9 | Tributylamine | 0.7 |
| Example 27 | 320 | 13 | 25 | 21 | 176 | 15 | 38 | 3 | MTMS | 6.9 | 3-Indoleacetonitrile | 0.7 |
| Example 28 | 320 | 19 | 25 | 21 | 176 | 19 | 30 | 3 | MTMS | 6.9 | TP415 | 2.6 |
| Example 29 | 320 | 13 | 25 | 35 | 176 | 9 | 25 | 3 | MTMS | 6.9 | TP415 | 2.6 |
| Comparative Example 1 | 320 | 65 | 10 | 7 | 50 | 4 | 241 | 42 | MTMS | 69.0 | TP415 | 0.3 |
| Comparative Example 2 | 320 | 13 | 25 | 21 | 176 | 15 | 21 | 1 | MTMS | 0.1 | TP415 | 0.3 |
| Reference Example 1 | 320 | 13 | 25 | 21 | 176 | 15 | 38 | 3 | MTMS | 6.9 | TP415 | 0 |
| Reference Example 2 | 320 | 13 | 25 | 21 | 176 | 15 | 38 | 3 | MTMS | 3.5 | TP415 | 10.4 |

| | Characteristics of the particles | | | | | | | | | |
|---|---|---|---|---|---|---|---|---|---|---|
| | Particle size nm | Pore volume D after baking at 350° C. $cm^3/g$ | Pore volume B after baking at 350° C. $cm^3/g$ | Pore volume C before baking at 350° C. $cm^3/g$ | Pore volume A before baking at 350° C. $cm^3/g$ | D/B — | C/D — | A/B — | N compound content % | Evaluation Charge build-up seconds |
| Example 1 | 65 | 0.51 | 0.30 | 0.23 | 0.12 | 1.67 | 0.45 | 0.39 | 0.36 | 5 |
| Example 2 | 60 | 0.14 | 0.28 | 0.06 | 0.18 | 0.50 | 0.46 | 0.64 | 0.24 | 10 |
| Example 3 | 63 | 0.18 | 0.33 | 0.08 | 0.19 | 0.55 | 0.45 | 0.59 | 0.33 | 5 |
| Example 4 | 65 | 0.51 | 0.71 | 0.20 | 0.48 | 0.71 | 0.39 | 0.67 | 0.48 | 5 |
| Example 5 | 65 | 0.51 | 0.41 | 0.20 | 0.20 | 1.25 | 0.39 | 0.49 | 0.48 | 5 |
| Example 6 | 65 | 0.80 | 0.49 | 0.32 | 0.25 | 1.61 | 0.40 | 0.51 | 0.48 | 5 |
| Example 7 | 70 | 0.53 | 0.27 | 0.23 | 0.17 | 2.00 | 0.44 | 0.65 | 0.29 | 5 |
| Example 8 | 65 | 0.80 | 0.35 | 0.33 | 0.22 | 2.30 | 0.42 | 0.64 | 0.38 | 10 |
| Example 9 | 65 | 0.80 | 0.32 | 0.42 | 0.19 | 2.50 | 0.53 | 0.60 | 0.29 | 10 |
| Example 10 | 60 | 0.10 | 0.20 | 0.06 | 0.16 | 0.50 | 0.58 | 0.82 | 0.19 | 30 |
| Example 11 | 40 | 1.10 | 0.51 | 0.43 | 0.30 | 2.14 | 0.39 | 0.58 | 0.48 | 10 |
| Example 12 | 200 | 0.24 | 0.14 | 0.14 | 0.12 | 1.67 | 0.59 | 0.85 | 0.02 | 30 |
| Example 13 | 60 | 0.54 | 0.34 | 0.20 | 0.14 | 1.59 | 0.37 | 0.42 | 0.48 | 5 |
| Example 14 | 60 | 0.54 | 0.34 | 0.13 | 0.00 | 1.59 | 0.24 | 0.00 | 1.20 | 5 |
| Example 15 | 60 | 0.18 | 0.29 | 0.01 | 0.00 | 0.60 | 0.05 | 0.00 | 1.05 | 5 |
| Example 16 | 62 | 0.18 | 0.28 | 0.12 | 0.21 | 0.63 | 0.70 | 0.75 | 0.19 | 10 |
| Example 17 | 60 | 0.17 | 0.31 | 0.14 | 0.26 | 0.54 | 0.82 | 0.85 | 0.14 | 30 |
| Example 18 | 80 | 0.43 | 0.27 | 0.12 | 0.00 | 1.59 | 0.27 | 0.00 | 0.95 | 5 |
| Example 19 | 64 | 0.18 | 0.29 | 0.13 | 0.27 | 0.61 | 0.76 | 0.92 | 0.10 | 30 |
| Example 20 | 30 | 0.98 | 0.59 | 0.26 | 0.18 | 1.67 | 0.27 | 0.30 | 0.95 | 5 |
| Example 21 | 40 | 0.76 | 0.46 | 0.21 | 0.04 | 1.67 | 0.27 | 0.10 | 0.95 | 5 |
| Example 22 | 200 | 0.24 | 0.14 | 0.11 | 0.07 | 1.67 | 0.48 | 0.52 | 0.19 | 5 |
| Example 23 | 210 | 0.23 | 0.14 | 0.11 | 0.07 | 1.67 | 0.48 | 0.51 | 0.19 | 5 |
| Example 24 | 65 | 0.51 | 0.30 | 0.26 | 0.21 | 1.67 | 0.50 | 0.69 | 0.86 | 5 |
| Example 25 | 65 | 0.51 | 0.30 | 0.14 | 0.05 | 1.67 | 0.27 | 0.16 | 0.47 | 5 |
| Example 26 | 65 | 0.51 | 0.30 | 0.27 | 0.22 | 1.67 | 0.52 | 0.73 | 0.84 | 10 |
| Example 27 | 65 | 0.51 | 0.30 | 0.27 | 0.23 | 1.67 | 0.52 | 0.75 | 0.93 | 10 |
| Example 28 | 65 | 0.50 | 0.32 | 0.23 | 0.13 | 1.56 | 0.46 | 0.41 | 0.36 | 5 |
| Example 29 | 65 | 0.51 | 0.33 | 0.22 | 0.15 | 1.55 | 0.43 | 0.45 | 0.36 | 5 |
| Comparative Example 1 | 70 | 0.03 | 0.21 | 0.03 | 0.21 | 0.15 | 0.87 | 0.99 | 0.05 | 60 |
| Comparative Example 2 | 60 | 0.77 | 0.08 | 0.70 | 0.08 | 9.62 | 0.91 | 0.94 | 0.05 | 120 |
| Reference Example 1 | 60 | 0.54 | 0.34 | 0.54 | 0.34 | 1.59 | 1.00 | 1.00 | 0 | 300 |

TABLE 1-continued

| | | | | | | | | | | |
|---|---|---|---|---|---|---|---|---|---|---|
| Reference Example 2 | 60 | 0.54 | 0.34 | 0.005 | 0.00 | 1.59 | 0.01 | 0.00 | 1.43 | 60 |

As can be seen from these results, in the Examples, compared with the Comparative Examples, the silica particles may be superior in charge build-up.

Reference Example 1 is an example in which the silica particles are ones having a D/B as described in an exemplary embodiment but contain no nitrogen-containing compound.

Reference Example 2 is an example in which the silica particles are ones having a D/B as described in an exemplary embodiment but contain an excessive amount of nitrogen-containing compound.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

A silica particle, wherein:

a pore size distribution curve obtained by nitrogen gas adsorption of the silica particle after baking at 350° C. has at least one peak at a pore diameter of 2 nm or less and at least one peak at a pore diameter of more than 2 nm and 50 nm or less; and D/B is 0.50 or greater and 2.50 or less, where D and B are volumes of pores having a diameter of 2 nm or less and a diameter of 2 nm or more and 25 nm or less, respectively, determined from the pore size distribution curve obtained by nitrogen gas adsorption of the silica particle after baking at 350° C.

(((2)))

The silica particle according to (((1))), wherein the D/B is 0.55 or greater and 2.00 or less.

(((3)))

The silica particle according to (((1))) or (((2))), wherein the D is 0.10 $cm^3/g$ or more and 1.10 cm3/g or less.

(((4)))

The silica particle according to any one of (((1))) to (((3))), including a nitrogen-containing compound.

(((5)))

The silica particle according to (((4))), wherein an amount of the nitrogen-containing compound is 0.02% by mass or more and 1.20% by mass or less as a nitrogen content of the silica particle.

(((6)))

The silica particle according to (((4))) or (((5))), wherein a ratio C/D is 0.05 or greater and 0.82 or less, where C is a volume of pores having a diameter of 2 nm or less determined from a pore size distribution curve obtained by nitrogen gas adsorption of the silica particle before baking at 350° C.

(((7)))

The silica particle according to (((6))), wherein the C/D is 0.05 or greater and 0.70 or less.

(((8)))

The silica particle according to any one of (((4))) to (((7))), wherein a ratio A/B is 0 or greater and 0.92 or less, where A is a volume of pores having a diameter of 2 nm or more and 25 nm or less determined from a pore size distribution curve obtained by nitrogen gas adsorption of the silica particle before baking at 350° C.

(((9)))

The silica particle according to any one of (((4))) to (((8))), wherein a number-average diameter of the silica particles is 40 nm or more and 200 nm or less.

(((10)))

The silica particle according to any one of (((4))) to (((9))), wherein the nitrogen-containing compound is at least one selected from the group consisting of quaternary ammonium salts, primary amine compounds, secondary amine compounds, tertiary amine compounds, amide compounds, imine compounds, and nitrile compounds.

(((11)))

A toner for developing an electrostatic charge image, the toner including:

a toner particle; and the silica particle according to any one of (((4))) to (((10))) as an external additive attached to the toner particle.

(((12)))

An electrostatic charge image developer including the toner according to (((11))) for developing an electrostatic charge image.

(((13)))

A toner cartridge attachable to and detachable from an image forming apparatus, the toner cartridge containing:

the toner according to (((11))) for developing an electrostatic charge image.

(((14)))

A process cartridge attachable to and detachable from an image forming apparatus, the process cartridge including:

a developing component that contains the electrostatic charge image developer according to (((12))) and develops, using the electrostatic charge image developer, an electrostatic charge image on a surface of an image carrier to form a toner image.

(((15)))

An image forming apparatus including:

an image carrier;

a charging component that charges a surface of the image carrier;

an electrostatic charge image creating component that creates an electrostatic charge image on the charged surface of the image carrier;

a developing component that contains the electrostatic charge image developer according to (((12))) and develops, using the electrostatic charge image developer, the electrostatic charge image on the surface of the image carrier to form a toner image;

a transfer component that transfers the toner image on the surface of the image carrier to a surface of a recording medium; and a fixing component that fixes the toner image on the surface of the recording medium.

(((16)))

An image forming method including:

charging a surface of an image carrier;

creating an electrostatic charge image on the charged surface of the image carrier;

developing, using the electrostatic charge image developer according to (((12))), the electrostatic charge image on the surface of the image carrier to form a toner image;

transferring the toner image on the surface of the image carrier to a surface of a recording medium; and fixing the toner image on the surface of the recording medium.

What is claimed is:

1. A silica particle, wherein:

a pore size distribution curve obtained by nitrogen gas adsorption of the silica particle after baking at 350° C. has at least one peak at a pore diameter of 2 nm or less and at least one peak at a pore diameter of more than 2 nm and 50 nm or less; and D/B is 0.50 or greater and 2.50 or less, where D and B are volumes of pores having a diameter of 2 nm or less and a diameter of 2 nm or more and 25 nm or less, respectively, determined from the pore size distribution curve obtained by nitrogen gas adsorption of the silica particle after baking at 350° C.

2. The silica particle according to claim 1, wherein:

the D/B is 0.55 or greater and 2.00 or less.

3. The silica particle according to claim 1, wherein:

the D is 0.10 $cm^3/g$ or more and 1.10 $cm^3/g$ or less.

4. The silica particle according to claim 1, comprising:

a nitrogen-containing compound.

5. The silica particle according to claim 4, wherein:

an amount of the nitrogen-containing compound is 0.02% by mass or more and 1.20% by mass or less as a nitrogen content of the silica particle.

6. The silica particle according to claim 4, wherein:

a ratio C/D is 0.05 or greater and 0.82 or less, where C is a volume of pores having a diameter of 2 nm or less determined from a pore size distribution curve obtained by nitrogen gas adsorption of the silica particle before baking at 350° C.

7. The silica particle according to claim 6, wherein:

the C/D is 0.05 or greater and 0.70 or less.

8. The silica particle according to claim 4, wherein:

a ratio A/B is 0 or greater and 0.92 or less, where A is a volume of pores having a diameter of 2 nm or more and 25 nm or less determined from a pore size distribution curve obtained by nitrogen gas adsorption of the silica particle before baking at 350° C.

9. The silica particle according to claim 4, wherein:

a number-average diameter of the silica particles is 40 nm or more and 200 nm or less.

10. The silica particle according to claim 4, wherein:

the nitrogen-containing compound is at least one selected from the group consisting of quaternary ammonium salts, primary amine compounds, secondary amine compounds, tertiary amine compounds, amide compounds, imine compounds, and nitrile compounds.

11. A toner for developing an electrostatic charge image, the toner comprising:

a toner particle; and the silica particle according to claim 4 as an external additive attached to the toner particle.

12. A toner for developing an electrostatic charge image, the toner comprising:

a toner particle; and the silica particle according to claim 5 as an external additive attached to the toner particle.

13. A toner for developing an electrostatic charge image, the toner comprising:

a toner particle; and the silica particle according to claim 6 as an external additive attached to the toner particle.

14. A toner for developing an electrostatic charge image, the toner comprising:

a toner particle; and the silica particle according to claim 7 as an external additive attached to the toner particle.

15. A toner for developing an electrostatic charge image, the toner comprising:

a toner particle; and the silica particle according to claim 8 as an external additive attached to the toner particle.

16. An electrostatic charge image developer comprising:

the toner according to claim 11 for developing an electrostatic charge image.

17. A toner cartridge attachable to and detachable from an image forming apparatus, the toner cartridge comprising:

the toner according to claim 11 for developing an electrostatic charge image.

18. A process cartridge attachable to and detachable from an image forming apparatus, the process cartridge comprising:

a developing component that contains the electrostatic charge image developer according to claim 16 and develops, using the electrostatic charge image developer, an electrostatic charge image on a surface of an image carrier to form a toner image.

19. An image forming apparatus comprising:

an image carrier;

a charging component that charges a surface of the image carrier;

an electrostatic charge image creating component that creates an electrostatic charge image on the charged surface of the image carrier;

a developing component that contains the electrostatic charge image developer according to claim 16 and develops, using the electrostatic charge image developer, the electrostatic charge image on the surface of the image carrier to form a toner image;

a transfer component that transfers the toner image on the surface of the image carrier to a surface of a recording medium; and a fixing component that fixes the toner image on the surface of the recording medium.

20. An image forming method comprising:

charging a surface of an image carrier;

creating an electrostatic charge image on the charged surface of the image carrier;

developing, using the electrostatic charge image developer according to claim 16, the electrostatic charge image on the surface of the image carrier to form a toner image;

transferring the toner image on the surface of the image carrier to a surface of a recording medium; and fixing the toner image on the surface of the recording medium.

* * * * *